United States Patent
Porta

(10) Patent No.: US 11,109,152 B2
(45) Date of Patent: Aug. 31, 2021

(54) OPTIMIZE THE AUDIO CAPTURE DURING CONFERENCE CALL IN CARS

(71) Applicant: Ambarella International LP

(72) Inventor: Pier Paolo Porta, Fidenza (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/665,378

(22) Filed: Oct. 28, 2019

(65) Prior Publication Data

US 2021/0127204 A1 Apr. 29, 2021

(51) Int. Cl.
| | | |
|---|---|---|
| H04M 3/56 | (2006.01) | |
| H04R 3/00 | (2006.01) | |
| G06K 9/00 | (2006.01) | |
| H04R 1/40 | (2006.01) | |
| G06N 3/08 | (2006.01) | |
| G06N 3/04 | (2006.01) | |

(52) U.S. Cl.
CPC ......... *H04R 3/005* (2013.01); *G06K 9/00255* (2013.01); *G06K 9/00845* (2013.01); *G06N 3/04* (2013.01); *G06N 3/08* (2013.01); *H04M 3/568* (2013.01); *H04R 1/406* (2013.01); H04M 2201/41 (2013.01); H04M 2203/509 (2013.01); H04R 2201/401 (2013.01); H04R 2499/13 (2013.01)

(58) Field of Classification Search
CPC .. H04R 3/005; H04R 1/406; H04R 2201/401; H04M 3/568; H04M 2203/509; H04M 2201/41; G06K 9/00845; G06K 9/00255; G06N 3/04
See application file for complete search history.

(56) References Cited

U.S. PATENT DOCUMENTS

| | | | | |
|---|---|---|---|---|
| 10,140,515 B1* | 11/2018 | Waldo | ................. | G06K 9/6273 |
| 10,248,866 B1* | 4/2019 | Cotoros | ............. | G06K 9/00718 |
| 2002/0101505 A1* | 8/2002 | Gutta | ....................... | H04N 7/15 348/14.07 |
| 2010/0189275 A1* | 7/2010 | Christoph | .............. | H04R 3/005 381/66 |
| 2014/0337016 A1* | 11/2014 | Herbig | ................. | H04M 3/568 704/201 |
| 2017/0337438 A1* | 11/2017 | el Kaliouby, Jr. | ..... | G16H 50/20 |
| 2018/0121712 A1* | 5/2018 | Garrett | ................... | H04R 1/406 |
| 2019/0104371 A1* | 4/2019 | Ballande | ............. | H04R 25/405 |
| 2019/0341055 A1* | 11/2019 | Krupka | .................. | G10L 17/04 |

* cited by examiner

*Primary Examiner* — Ping Lee

(74) *Attorney, Agent, or Firm* — Christopher P. Maiorana, PC

(57) ABSTRACT

An apparatus including an interface and a processor. The interface may be configured to receive video frames corresponding to an interior of a vehicle. The processor may be configured to perform video operations on the video frames to detect objects in the video frames, detect one or more passengers based on the objects detected in the video frames, determine a location of each of the passengers detected, determine which of the passengers may be an audio source and generate a control signal in response to the audio source. The control signal may be configured to adjust an input of a microphone towards the audio source. The video operations may be used to determine the location and the audio source.

20 Claims, 13 Drawing Sheets

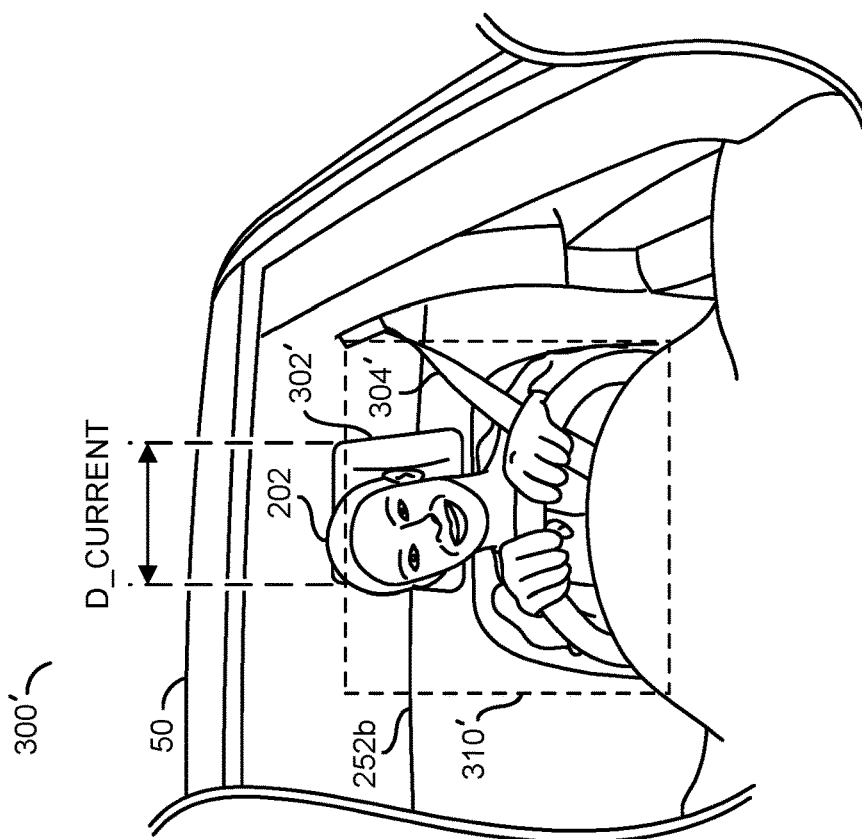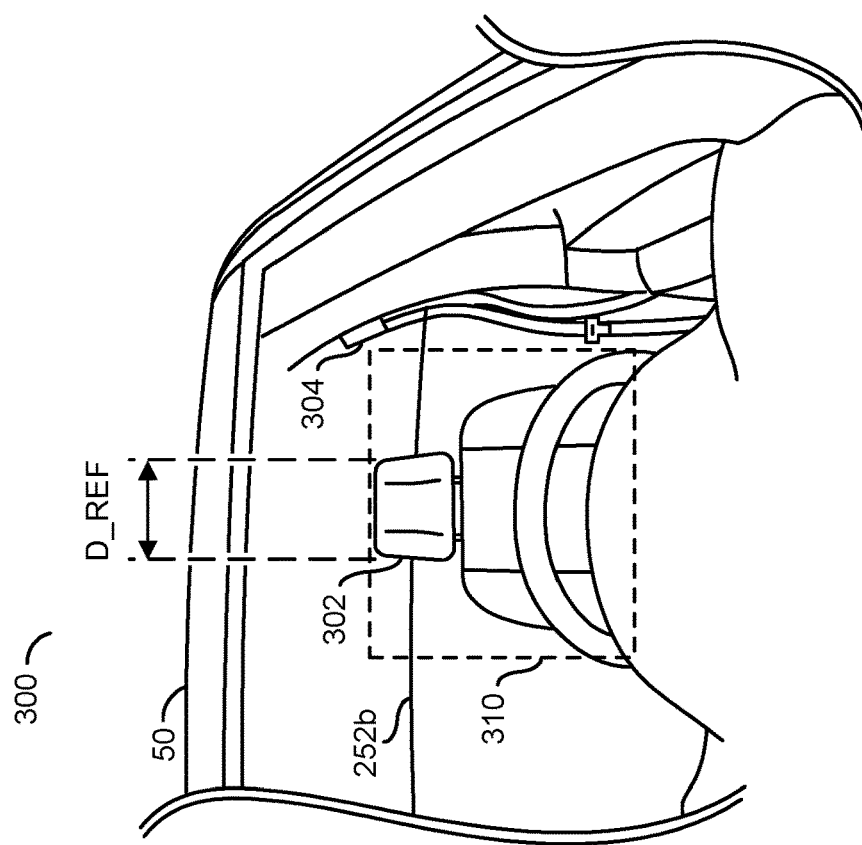
FIG. 4

11,109,152 B2

OPTIMIZE THE AUDIO CAPTURE DURING CONFERENCE CALL IN CARS

FIELD OF THE INVENTION

The invention relates to computer vision generally and, more particularly, to a method and/or apparatus for implementing optimize the audio capture during conference call in cars.

BACKGROUND

As technology advances and becomes more portable, vehicles are incorporating more functionality. Aside from transportation, vehicles now provide more options for entertainment and conducting business. Technology implemented in vehicles can include video recording using in-cabin cameras as well as voice commands using in-cabin microphones.

In-cabin microphones can be used with communications technology to enable in-vehicle phone calls. However, vehicle interiors can be noisy due to sounds outside the vehicle. Also sound quality can suffer when there are multiple occupants within the vehicle.

It would be desirable to implement optimize the audio capture during conference call in cars.

SUMMARY

The invention concerns an apparatus including an interface and a processor. The interface may be configured to receive video frames corresponding to an interior of a vehicle. The processor may be configured to perform video operations on the video frames to detect objects in the video frames, detect one or more passengers based on the objects detected in the video frames, determine a location of each of the passengers detected, determine which of the passengers may be an audio source and generate a control signal in response to the audio source. The control signal may be configured to adjust an input of a microphone towards the audio source. The video operations may be used to determine the location and the audio source.

BRIEF DESCRIPTION OF THE FIGURES

Embodiments of the invention will be apparent from the following detailed description and the appended claims and drawings.

FIG. 4 is a diagram illustrating an object comparison between a reference video frame and a captured video frame.

DETAILED DESCRIPTION OF THE EMBODIMENTS

Embodiments of the present invention include providing optimization of the audio capture during conference call in cars that may (i) locate passengers within a vehicle, (ii) implement computer vision to analyze video frames of a vehicle interior, (iii) detect mouth movements to determine who is speaking, (iv) analyze sound fields, (v) compare audio in a sound field with mouth movements in a video, (vi) calibrate an omnidirectional microphone in real time based on who is speaking, (vii) enable an in-vehicle conference call and/or (viii) be implemented as one or more integrated circuits.

Embodiments of the present invention may be configured to adjust audio capture within a vehicle. Adjusting the audio capture may provide focused audio capture for each occupant. By focusing the audio capture for each occupant, the audio capture may be optimized. Embodiments of the present invention may be implemented to enable conference calls within the vehicle.

Embodiments of the present invention may be implemented as part of a cabin monitoring system. Computer vision may be implemented to perform the cabin monitoring. In an example, the computer vision operations may be configured to locate the heads and/or faces of the occupants within the cabin of the vehicle. The location of the heads and/or faces of the occupants may be used to determine a position of each occupant within the vehicle.

Using the results of the computer vision, embodiments of the present invention may be configured to identify which of the occupants of the vehicle is talking. Which occupant is talking may be determined based on mouth movements detected in captured video data. To ensure that the mouth movement corresponds to the detected audio, the mouth movements may be compared with sound field analysis. For example, the sound field analysis may determine when particular sounds were made and/or what types of sounds were made. The mouth movements may be compared to when the sounds were made and/or the type of sounds made to determine if the occupant is talking.

Once the occupant that is speaking is determined, embodiments of the present invention may be configured to enhance the audio captured based on the location of the person talking within the vehicle. In an example, an omnidirectional microphone may be implemented within the vehicle. A control signal may be generated in response to detecting the location of the occupant that is speaking that adjusts the omnidirectional microphone to focus on the occupant that is speaking. Embodiments of the present invention may update the location of the speaking occupant in real time to enable the microphone to be adjusted for a different occupant speaking (e.g., in a scenario of a conference call, different occupants may take turns speaking).

Figure 1:
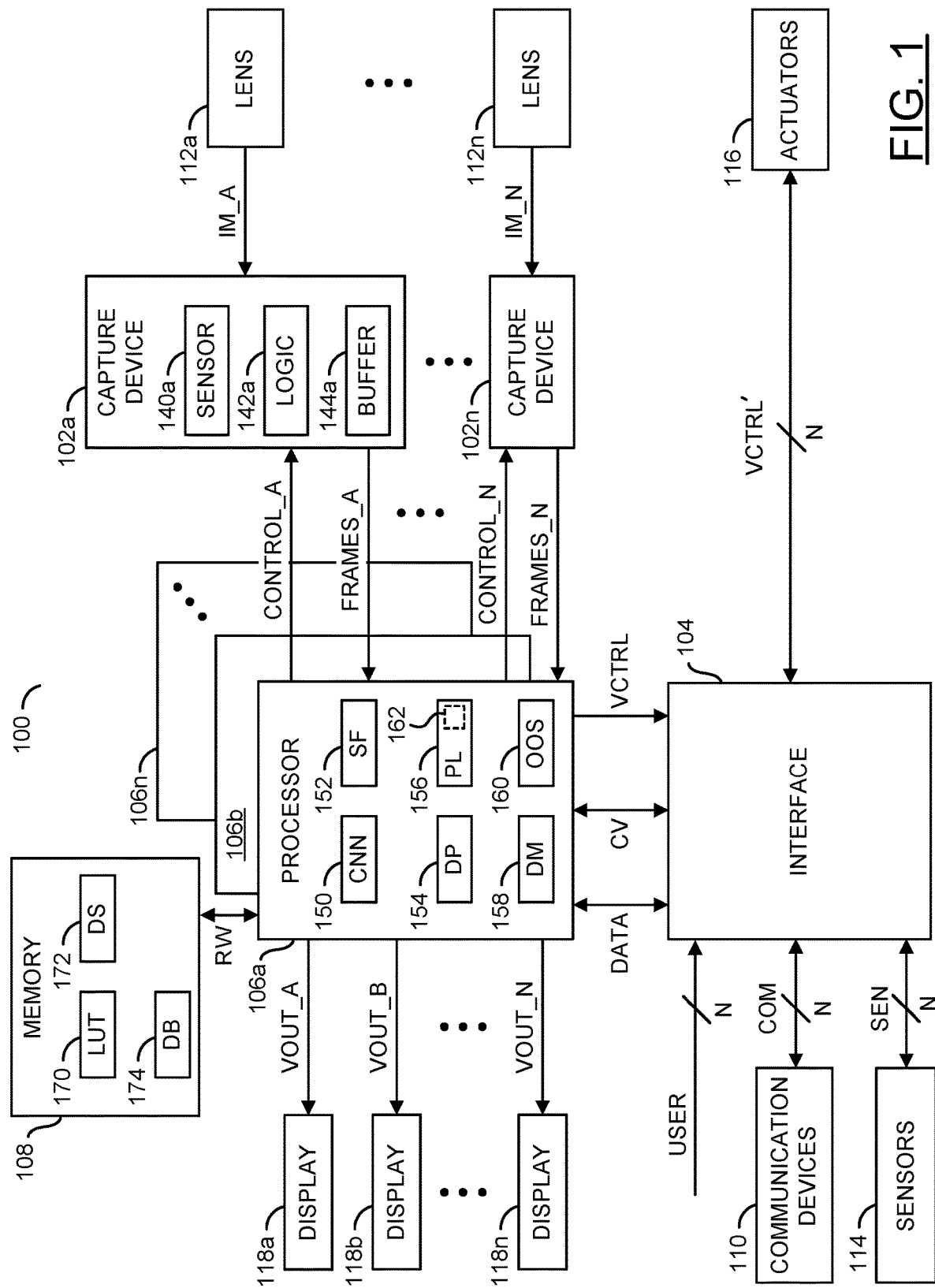
FIG. 1 is a diagram illustrating an embodiment of the present invention.

Referring to FIG. 1, a diagram illustrating an embodiment of the present invention 100 is shown. The apparatus 100 generally comprises and/or communicates with blocks (or circuits) 102a-102n, a block (or circuit) 104, blocks (or circuits) 106a-106n, a block (or circuit) 108, a block (or circuit) 110, blocks (or circuits) 112a-112n, a block (or circuit) 114, a block (or circuit) 116 and/or blocks (or circuits) 118a-118n. The circuits 102a-102n may each implement a capture device. The circuits 104 may implement an interface circuit. The circuits 106a-106n may each implement a processor (or co-processors). In an example implementation, the circuits 106a-106n may each be implemented as a video processor and/or a computer vision processor. The circuit 108 may implement a memory. The circuit 110 may implement one or more communication devices. The blocks 112a-112n may implement lenses. The circuit 114 may implement one or more vehicle sensors. The circuit 116 may implement one or more vehicle actuators. The circuits 118a-118n may each implement a display. The apparatus 100 may comprise other components (not shown). The number, type and/or arrangement of the components of the apparatus 100 may be varied according to the design criteria of a particular implementation.

In various embodiments of the apparatus 100, the components 102a-118n may be implemented as a distributed camera system 100. In the distributed system embodiment of the apparatus 100, each component may be implemented separately throughout an installation location (e.g., such as a vehicle). In some embodiments of the apparatus 100, the components 102a-118n may be implemented on a printed circuit board (e.g., a single module). In the single module embodiment, each component may be connected to a single module (e.g., such as a circuit board on a small device such as a drone). In some embodiments, some of the components 102a-118n may be implemented on a single module and some of the components 102a-118n may be distributed throughout the installation location. For example, the apparatus 100 may be implemented as a drop-in solution (e.g., installed as one component). In some embodiments, the apparatus 100 may be a device that may be installed as an after-market product for a vehicle (e.g., a retro-fit for a vehicle). In some embodiments, one or more of the components 102a-118n may be components separate from the apparatus 100 that may be accessed by the interface 104 and/or the processors 106a-106n.

In some embodiments, the apparatus 100 may implement one of the processors 106a-106n. In some embodiments, the apparatus 100 may implement multiple processors 106a-106n. For example, the processors 106a may have multiple co-processors 106b-106n. Similarly, the interface 104 may be implemented as multiple interfaces each supporting different communication protocols. In another example, the communication devices 110 may be implemented as many modules, each implementing a different communications standard (e.g., Bluetooth, Wi-Fi, LTE, etc.). In some embodiments, the one or more of the components 102a-118n may be implemented as part of another one of the components 102a-118n. For example, the memory 108 may be implemented as a component of the processors 106a-106n. In another example, the lenses 112a-112n and the capture devices 102a-102n may each be implemented as a respective single assembly. Generally, the apparatus 100 may be implemented as a system-on-chip (SoC).

The lenses 112a-112n (e.g., an optical lens) may be configured to capture a targeted view. Some of the lenses 112a-112n may be implemented to provide a targeted view of an area exterior to an object (e.g., the outside of a car). Some of the lenses 112a-112n may be implemented to provide a targeted view of an interior of an object (e.g., the cabin of a vehicle). The lenses 112a-112n may each capture and/or focus light as input data (e.g., IM_A-IM_N) and present the respective light input data IM_A-IM N to a respective one of the capture devices 102a-102n.

In embodiments implementing many of the lenses 112a-112n, each of the lenses 112a-112n may point in a different direction. By having each of the lenses 112a-112n capture a different direction, the apparatus 100 may capture a panoramic view of the environment and/or the interior of a vehicle. The lenses 112a-112n may be arranged to capture fields of view above and/or below a level of the vehicle. In some embodiments, lenses 112a-112n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 118a-118n).

Each of the capture devices 102a-102n may comprise one of blocks (or circuits) 140a-140n, one of blocks (or circuits) 142a-142n and/or one of blocks (or circuits) 144a-144n. The blocks 140a-140n may implement an image sensor (e.g., a camera sensor). The blocks 142a-142n may implement logic. The blocks 144a-144n may implement a buffer. For clarity, in the example shown, only the image sensor 140a, the logic 142a and the buffer 144a of the capture device 102a are shown. The capture devices 102a-102n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 102a-102n may each be configured to generate images and/or video frames in response to the signals IM_A-IM_N (e.g., perform an analog to digital conversion). The capture devices 102a-102n may capture data received through the lenses 112a-112n to generate video image data (e.g., generate video frames). The signals FRAMES_A-FRAMES_N may comprise video frames and/or images generated by the capture devices 102a-102n (e.g., video data). In some embodiments, the capture devices 102a-102n may be configured to perform depth sensing (e.g., the signals FRAMES_A-FRAMES_N may comprise depth information and/or vector light data in addition to the video frames). In one example, the capture devices 102a-102n may perform depth sensing using stereo cameras (e.g., cameras configured as a stereo pair to capture a depth map). In another example, the capture devices 102a-102n may perform depth sensing using time-of-flight. In yet another example, the capture devices 102a-102n may perform depth sensing using structured light. The video frames FRAMES_A-FRAMES_N may be presented to one or more of the processors 106a-106n. The signals CONTROL_A-CONTROL_N may comprise instruction signals for the capture devices 102a-102n and/or the lenses 112a-112n (e.g., to zoom, pan, focus, adjust settings, etc.). The signals CONTROL_A-CONTROL_N may be generated by the processors 106a-106n.

The interface circuit 104 may be configured to transmit and/or receive a number of signals. The interface circuit 104 may be configured to communicate information and/or convert information to/from various protocols. In some embodiments, the interface 104 may be implemented as one of the components of the processors 106a-106n. In some embodiments, the interface 104 may be implemented as a vehicle bus (e.g., a CAN bus). For example, for low speed communication, the vehicle CAN bus may be implemented. In some embodiments, the interface 104 may implement a high speed data transmission protocol (e.g., for video transmission). For example, the interface 104 may implement one or more of Ethernet, PCI-e, MIPI, etc. In some embodiments, the interface 104 may comprise many different components, each configured to communicate using a particular protocol. The interface 104 may comprise a data bus, traces, connectors, wires and/or pins. The implementation of the interface 104 may be varied according to the design criteria of a particular implementation.

In the example shown, the interface 104 may send and/or receive a signal (e.g., DATA), a signal (e.g., CV), a signal (e.g., VCTRL), a signal (e.g., COM), a signal (e.g., SEN), a signal (e.g., VCTRL') and/or a signal (e.g., USER). The signal USER may represent user inputs (e.g., turn signals, pressing the accelerator, pressing the brakes, interactions with an infotainment system, etc.). The signal SEN may represent information related to the vehicle sensors 114 such as calibration data from the processors 106a-106n and/or status information of the vehicle based on sensor readings (e.g., speed, acceleration, temperature, location, gyro orientation, etc.). The signal COM may represent information communicated to/from the communication devices 110. The signal VCTRL and VCTRL' may represent control instructions generated by the processors 106a-106n for the various vehicle actuators 116. The signal CV may represent computer vision data. The signal DATA may represent other data. The number of signals communicated and/or the types of data communicated using the interface 104 may be varied according to the design criteria of a particular implementation.

The processors 106a-106n may each comprise a block (or circuit) 150, a block (or circuit) 152, a block (or circuit) 154, a block (or circuit) 156, a block (or circuit) 158 and/or a block (or circuit) 160. The block 150 may implement a convolutional neural network (CNN) module. The block 152 may implement a sensor fusion module. The block 154 may implement a driving policy module. The block 156 may implement a video processing pipeline module. The block 158 may implement a decision making module. The block 160 may implement an open operand stack module. The processors 106a-106n may comprise other components (not shown). In some embodiments, one or more of the processors 106a-106n may not comprise each of the blocks 150-160. The modules 150-160 may each be implemented as dedicated hardware modules of the processors 106a-106n. The number, type and/or arrangement of the components of the processors 106a-106n may be varied according to the design criteria of a particular implementation.

The processors 106a-106n may be configured to execute computer readable code and/or process information. The processors 106a-106n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 118a-118n. For example the processors 106a-106n may be configured to generate the video data (e.g., VOUT_A-VOUT_N) for the displays 118a-118n in response to the video frames (e.g., FRAMES_A-FRAMES_N). The signal RW may communicate data to/from the memory 108. The signal VOUT_A-VOUT_N, the signals CONTROL_A-CONTROL_N, the signal DATA, the signal CV, the signal RW and/or the signal VCTRL may be generated based on one or more decisions made by the processors 106a-106n. The decisions made by the processors 106a-106n may be determined based on data received by the processors 106a-106n and/or based on an analysis of the signals FRAMES_A-FRAMES_N. The processors 106a-106n may implement other signals (not shown). The number and/or type of signals communicated by the processor 106a-106n may be varied according to the design criteria of a particular implementation.

The memory 108 may comprise a block (or circuit) 170, a block (or circuit) 172 and/or a block (or circuit) 174. The block 170 may implement a look up table. The block 172 may implement data storage. The block 174 may implement database storage (e.g., image feature sets, vehicle status, view options, GNSS/GPS positions, a schedule of a user, driver behavior, expected travel times/routes, user preferences, etc.). The memory 108 may be configured to store computer readable/executable instructions (or firmware or code). The instructions, when executed by the processors 106a-106n, may perform a number of steps. In some embodiments, the processors 106a-106n may be implemented as a system-on-chip (SoC) and the memory 108 may be a component of the processors 106a-106n. In some embodiments, the memory 108 may be implemented as part of a black box recorder implemented to survive collisions (e.g., to preserve data to assist in an investigation). The arrangement and/or type of data stored and/or the memory technology implemented (e.g., NAND, RAM, memristor, etc.) by the memory 108 may be varied according to the design criteria of a particular implementation.

The communication devices 110 may send and/or receive data to/from the apparatus 100. In some embodiments, the communication devices 110 may be implemented as a wireless communications module. In some embodiments, the communication devices 110 may be implemented as a satellite connection to a proprietary system (e.g., to provide advanced driver-assistance systems (ADAS) data and/or telemetry data). In some embodiments, the communication devices 110 may implement GPS and/or GNSS functionality. In one example, the communication device 110 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 110 may be a wireless data interface (e.g., Wi-Fi, Bluetooth, ZigBee, cellular (3G/4G/5G/LTE), etc.). In another example, the communication devices 110 may implement a radio-frequency (RF) transmitter.

The communication devices 110 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 110 may also include support for communication using one or more of the universal serial bus protocols (e.g., USB 1.0, 2.0, 3.0, etc.).

The sensors 114 may be used to determine the status information of the host object (e.g., the vehicle). The sensors 114 may implement a sensor array. The sensor array 114 may be used to determine the position of objects in a proximity range with respect to the apparatus 100. For example, the sensors 114 may implement a radar device, an array of radars, a sonar device, an array of sonars, a LIDAR device, an array of LIDAR devices, an ultra-sound device, an array of ultra-sound devices, etc. The sensors 114 may provide the sensor readings using the signal SEN. In some embodiments, the sensors 114 may be calibrated using the signal SEN. The types of the vehicle sensors 114 used to detect a proximity to other objects may be varied according to the design criteria of a particular implementation.

The actuators 116 may be used to cause an action. The actuators 116 may be implemented as an array of components. The actuators 116 may be configured to convert an electrical signal comprising information and/or instructions (e.g., the signal VCTRL') into a physical action. In an example, the actuators 116 may be configured to turn wheels, increase an acceleration, decrease an acceleration, activate and/or adjust headlights, activate a turn signal, activate air bags, engage/disengage locks, adjust heating/cooling control settings, adjust fan speed, adjust heated seats, etc. The actuators 116 may control various components of the host vehicle. The number, type and/or functionality of the actuators 116 may be varied according to the design criteria of a particular implementation.

The displays 118a-118n may each implement a screen and/or an output device. In one example, one or more of the displays 118a-118n may implement an electronic mirror (e.g., an e-mirror). In another example, one or more of the displays 118a-118n may implement a touchscreen for an infotainment system. In yet another example, one or more of the displays 118a-118n may implement a back-up camera and/or bird's-eye view camera. The displays 118a-118n may display a version of video frames captured by one or more of the lenses 112a-112n and/or the capture devices 102a-102n. The video frames captured by the capture device 102a-102n may be cropped, adjusted and/or encoded by the processors 106a-106n to fit the displays 118a-118n. For example, the processor 106a-106n may provide real time video streaming to the displays 118a-118n via the signals VOUT_A-VOUT_N.

The sensor 140a (e.g., a camera imaging sensor such as a CMOS sensor) of the capture device 102a may receive light from the lens 112a (e.g., the signal IM_A). The camera sensor 140a may perform a photoelectric conversion of the light from the lens 112a. The logic 142a may transform the bitstream into a human-legible content (e.g., video data and/or video frames). For example, the logic 142a may receive pure (e.g., raw) data from the camera sensor 140a and generate video data based on the raw data (e.g., the bitstream). The logic 142a may further control the lens 112a in response to the signal CONTROL_A. The memory buffer 144a may store the raw data and/or the processed bitstream. For example, the frame memory and/or buffer 144a may store (e.g., provide temporary storage and/or cache) one or more of the video frames (e.g., the video signal). In some embodiments, each of the capture devices 102a-102n may comprise other components (e.g., a battery, a motor, a microphone, etc.).

In some embodiments, the sensor 140a may implement an RGB-InfraRed (RGB-IR) sensor. The sensor 140a may comprise a filter array comprising a red filter, a green filter, a blue filter and a near-infrared (NIR) wavelength filter (e.g., similar to a Bayer Color Filter Array with one green filter substituted with the NIR filter). The sensor 140a may operate as a standard color sensor and a NIR sensor. Operating as a standard color sensor and NIR sensor may enable the sensor 140a to operate in various light conditions (e.g., day time and night time).

The CNN module 150 may be configured to implement convolutional neural network capabilities. The CNN module 150 may be configured to implement computer vision using deep learning techniques. The CNN module 150 may be configured to implement pattern and/or image recognition using a training process through multiple layers of feature-detection. Details of the computer vision operations implemented by the CNN module 150 may be described in association with FIG. 5.

The CNN module 150 may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching algorithm is generally incorporated by hardware in the CNN module 150 to find the most probable correspondences between feature points in a reference frame and a target frame. In a process to match pairs of reference and target feature points, each feature point may be represented by a descriptor (e.g., image patch, SIFT, BRIEF, ORB, FREAK, etc.). Implementing the CNN module 150 using dedicated hardware circuitry may enable calculating descriptor matching distances in real time.

The CNN module 150 may be a dedicated hardware module configured to perform feature detection of the video frames. The features detected by the CNN module 150 may be used to calculate descriptors. The CNN module 150 may determine a likelihood that pixels in the video frames belong to a particular object and/or objects in response to the descriptors. For example, using the descriptors, the CNN module 150 may determine a likelihood that pixels correspond to a particular object (e.g., a person, a vehicle, a car seat, a tree, etc.) and/or characteristics of the object (e.g., a mouth of a person, a hand of a person, headlights of a vehicle, a branch of a tree, a seatbelt of a seat, etc.). Implementing the CNN module 150 as a dedicated hardware module of the processors 106a-106n may enable the apparatus 100 to perform the computer vision operations locally (e.g., on-chip) without relying on processing capabilities of a remote device (e.g., communicating data to a cloud computing service).

The computer vision operations performed by the CNN module 150 may be configured to perform the feature detection on the video frames in order to generate the descriptors. The CNN module 150 may perform the object detection to determine regions of the video frame that have a high likelihood of matching the particular object. In one example, the types of object to match against (e.g., reference objects) may be customized using the open operand stack module 160. The CNN module 150 may be configured to perform local masking to the region with the high likelihood of matching the particular object(s) to detect the object.

The sensor fusion module 152 may be configured to analyze information from multiple sensors 114, capture devices 102a-102n and/or the database 174 for redundancy. By analyzing various data from disparate sources, the sensor fusion module 152 may be capable of making inferences about the data that may not be possible from one of the data sources alone. For example, the sensor fusion module 152 may analyze video data as well as radar, LIDAR, inertial, motion, V2X, location data (e.g., GPS, GNSS, ADAS, etc.), gaze direction, driver state, battery status and/or other sources to develop a model of a scenario to support decision making. The sensor fusion module 152 may also provide time correlation, spatial correlation and/or reliability among the data being received from the different sensors 114.

In an example, the sensor fusion module 152 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 152 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 152 may determine the reliability of objects detected by each sensor. The sensor fusion module 152 may adjust the weighting used to overlay the data to give more weight to reliable data and/or less weight to unreliable data (e.g., one of the capture devices 102a-102n may have low reliability in foggy conditions, but radar may have good reliability in foggy conditions). A confidence that the object is really there and is correctly identified may also be calculated in the sensor fusion module 152. The confidence data may be presented to the driving policy block 154 via an on-chip bus, rather than relying on an inter-chip bus.

The driving policy module 154 may be configured to enable human-like intuition. The driving policy module 154 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 154 may provide a rule set for ethics when making decisions.

The video pipeline 156 may be configured to encode video frames captured by each of the capture devices 102a-102n. In some embodiments, the video pipeline 156 may be configured to perform video stitching operations to stitch video frames captured by each of the lenses 112a-112n to generate the panoramic field of view (e.g., the panoramic video frames). The video pipeline 156 may be configured to perform de-warping, cropping, enhancements, rolling shutter corrections, stabilizing (e.g., electronic image stabilization (EIS)), downscaling, packetizing, compression, conversion, blending, synchronizing and/or other video operations. The architecture of the video pipeline 156 may enable the video operations to be performed on high resolution video and/or high bitrate video data in real time and/or near real time. The video pipeline module 156 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline 156 may enable 4K ultra high resolution with H.264 encoding at double real time speed (e.g., 60 fps), 4K ultra high resolution with H.265/HEVC at 30 fps, 4K AVC encoding and/or other types of encoding (e.g., VP8, VP9, AV1, etc.). The video data generated by the video pipeline module 156 may be compressed (e.g., using a lossless compression and/or a low amount of lossiness). The type of video operations and/or the type of video data operated on by the video pipeline 156 may be varied according to the design criteria of a particular implementation.

The video pipeline module 156 may implement a digital signal processing (DSP) module configured to receive information (e.g., pixel data values captured by the sensors 140a-140n) from the input signals FRAMES_A-FRAMES_N. The video pipeline module 156 may be configured to determine the pixel values (e.g., RGB, YUV, luminance, chrominance, etc.). The video pipeline module 156 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 156 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 156 may receive encoded and/or unencoded (e.g., raw) audio data from an audio interface. The video pipeline module 156 may also receive encoded audio data from a communication interface (e.g., USB and/or SDIO). The video pipeline module 156 may provide encoded video data to the communication devices 110 (e.g., using a USB host interface) and/or the displays 118a-118n (e.g., the signal VOUT_A-VOUT_N).

The video pipeline module 156 may implement scheduling. Scheduling may enable the video pipeline 156 to perform various discrete, asynchronous video operations and/or computer vision operations in parallel. The scheduling may enable data results from one video operation to be available by the time another video data operation needs the data results.

The decision making module 158 may be configured to generate the signal VCTRL. The decision making module 158 may be configured to use the information from the computer vision operations and/or the sensor fusion module 152 to determine which actions may be taken. For example, in an autonomous vehicle implementation, the decision making module 158 may determine which direction to turn. The decision making module 158 may utilize data from the CNN module 150 and/or computer vision data using a histogram oriented gradient (HOG). The sources of data for making decisions used by the decision making module 158 may be varied according to the design criteria of a particular implementation.

The decision making module 158 may be further configured to determine the video data to communicate to the displays 118a-118n. The signals VOUT_A-VOUT_N may be cropped and/or adjusted in response to decisions by the decision making module 158. For example, the decision module 158 may select one field of view (e.g., a wide angle field of view) instead of another field of view (e.g., a narrow angle field of view) to send to the display 118a as the signal VOUT_A. In another example, the decision making module 158 may determine which of the displays 118a-118n to use to display a notification (e.g., an advertisement) and/or where on the video data to place the notification. In yet another example, the decision making module 158 may adjust output characteristics of the displays 118a-118n (e.g., brightness, contrast, sharpness, etc.).

The operand stack module 160 generally contains basic tasks used in all autonomous vehicles (e.g., object detection, correlation, reliability, etc.). The openness of the operand stack module 160 may enable car manufacturers to add new and/or proprietary features that could distinguish particular vehicles in the marketplace. The open operand stack module 160 may enable programmability.

The video processing pipeline 156 is shown comprising a block (or circuit) 162. The circuit 162 may implement a computer vision pipeline portion. The computer vision pipeline portion 162 may be configured to implement a computer vision algorithm in dedicated hardware. The computer vision pipeline portion 162 may implement a number of sub-modules designed to perform various calculations used to perform feature detection in images (e.g., video frames). Implementing sub-modules may enable the hardware used to perform each type of calculation to be optimized for speed and/or efficiency. For example, the sub-modules may implement a number of relatively simple operations that are used frequently in computer vision operations that, together, may enable the computer vision algorithm to be performed in real time. The computer vision pipeline portion 162 may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects.

The look up table 170 may comprise reference information. In one example, the look up table 170 may allow the captured video data to be compared to and/or cross-referenced with some known set of data. In another example, the look up table 170 may allow the sensor fusion module 152 to compare and/or cross-reference data from the sensors 114 with some known sensor values (e.g., temperature, humidity, etc.). Generally, the look up table 170 may be implemented to index pre-calculated values to save computation time.

The data storage 172 may comprise various data types stored by the memory 108. In an example, the data storage 172 may correspond to detected objects, reference objects, a video file, status information (e.g., readings from the sensors 114) and/or metadata information. The types of data and/or the arrangement of data stored in the memory 108 may be varied according to the design criteria of a particular implementation.

The database storage 174 may comprise information about user preferences for one or more users of a vehicle. In an example, different drivers may have different driving behaviors (e.g., time of day the driver travels, the usual routes the driver travels, camera view preferences, etc.). The database storage 174 may be comprise information about particular conditions associated with selecting particular camera views for display. The type of data stored about each driver and/or vehicle occupant in the database storage 174 may be varied according to the design criteria of a particular implementation.

The database storage 174 may comprise information about detected events. The decision module 158 may determine whether an event has occurred based on information from the CNN module 150 and/or the sensor fusion module 152. An event may be a scenario determined by the decision module 158 to be worth storing information about (e.g., a collision, an unknown object detected, a near miss, etc.). The database storage 174 may store metadata corresponding to the detected event. The metadata may comprise a location, a time-of-day timestamp, detected weather conditions, speed of the vehicles, acceleration of the vehicles, etc.). In some embodiments, the metadata may comprise a log of all the measurements of the sensors 114.

In some embodiments, the database storage 174 may comprise information about particular individuals. In an example, the database storage 174 may comprise information about faces for one or more people. The facial information may be used to perform facial recognition to identify a passenger as a particular person. In an example, the facial information may comprise descriptors and/or features corresponding to one or more individuals (e.g., the vehicle owner and the family members of the vehicle owner). The facial information stored in the database 174 may be used to enable the apparatus 100 to perform specific actions for specific people.

In some embodiments, the video data generated by the processors 106a-106n may be a panoramic video. The video data may be communicated over a network via the communication devices 110. For example, the network may be a bandwidth-constrained network (e.g., a wireless network). The processors 106a-106n may combine hardware de-warping, intelligent video analytics and/or digital zooming. The processors 106a-106n may reduce wireless bandwidth consumption when communicating video data. The processors 106a-106n may increase image resolution within the available bandwidth.

In some embodiments, portions of the panoramic video may be cropped to the size of a particular one of the displays 118a-118n by the processors 106a-106n (e.g., portions of the panoramic video outside of the cropped portion may be discarded and/or not displayed). In some embodiments, the panoramic video may be panned in one or more directions to see additional portions of the panoramic video outside of the field of view of the displays 118a-118n. For example, the panoramic video may comprise a spherical video, a hemispherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 180 degree field of view, etc.). In some embodiments, each of the lenses 112a-112n may be used to capture video frames that provide a portion of a field of view that may be stitched together to provide a field of view that is wider than the field of view captured by each individual one of the lenses 112a-112n. The processors 106a-106n may be configured to perform video stitching operations to stitch together video frames (e.g., arrange video frames according to position and/or time, reduce parallax effects, reduce distortions, etc.).

In some embodiments, the capture devices 102a-102n may implement a rolling shutter sensor. Using a rolling shutter sensor, a small amount of time difference may be present between some portions of each video frame. The processors 106a-106n may be configured to de-warp and/or correct a rolling shutter effect for each video frame.

In some embodiments, the apparatus 100 may further comprise an audio capture device (e.g., a microphone). The audio capture device may capture audio of the environment. The processors 106a-106n may be configured to synchronize the audio captured with the images captured by the capture devices 102a-102n.

The processors 106a-106n may generate output video data and/or video data that may be used internally within the processors 106a-106n. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, downscaled, packetized, blended, stitched and/or rolling shutter effect corrected versions of the signals FRAMES_A-FRAMES_N. The enhanced versions of the signals FRAMES_A-FRAMES_N may improve upon the view captured by the lenses 112a-112n (e.g., provide night vision, provide High Dynamic Range (HDR) imaging, provide more viewing area, highlight detected objects, provide additional information such as numerical distances to detected objects, provide bounding boxes for detected objects, etc.).

The processors 106a-106n may be configured to implement intelligent vision processors. The intelligent vision processors 106a-106n may implement multi-object classification. In one example, multi-object classification may comprise detecting multiple objects in the same video frames using parallel processing that reduces power consumption and/or computational resources compared to detecting multiple objects one object at a time. The multi-object classification may further comprise determining multiple inferences at a time (e.g., compared to first detecting whether an object exists, then detecting that the object is a driver, then determining whether the driving is holding the steering wheel, etc.).

Figure 2:
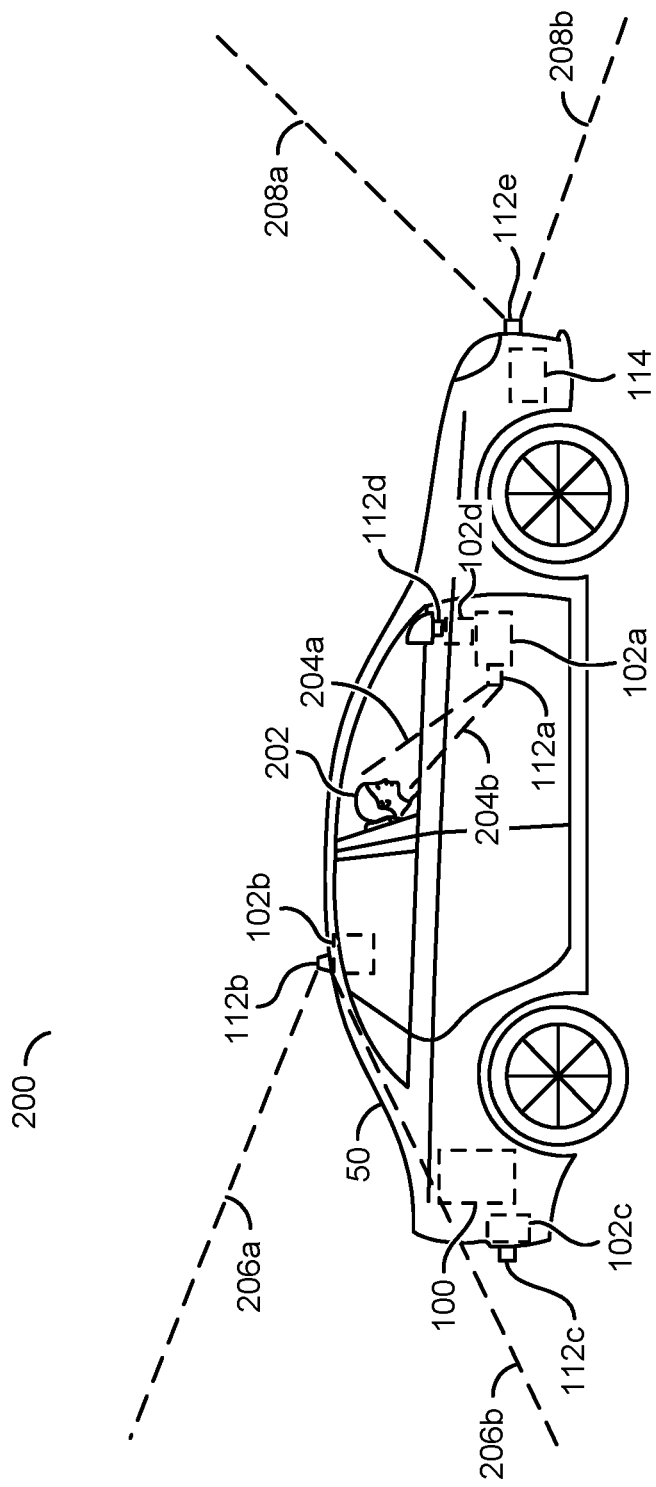
FIG. 2 is a diagram illustrating an example of camera systems inside and outside of a vehicle.

Referring to FIG. 2, a diagram illustrating an example embodiment 200 of camera systems inside and outside of a vehicle is shown. An automobile/vehicle 50 is shown. The apparatus 100 is shown as a component of the vehicle 50 (e.g., an ego vehicle). In the example shown, the ego vehicle 50 is a car. In some embodiments, the ego vehicle 50 may be a truck, an ATV, an airplane, a drone, etc. The type of the ego vehicle 50 implementing the apparatus 100 may be varied according to the design criteria of a particular implementation.

A driver 202 is shown seated in the ego vehicle 50. The vehicle sensors 114 are shown on (or in) the ego vehicle 50. The apparatus 100 is shown in the rear of the ego vehicle 50. In another example, the apparatus 100 may be distributed throughout the ego vehicle 50 (e.g., connections may be implemented between the apparatus 100 and the capture devices 102a-102d and/or sensors 114 such as a direct wired connection and/or a connection using a common bus line). A location of the apparatus 100 may be varied according to the design criteria of a particular implementation.

A camera (e.g., the lens 112a and the capture device 102a) is shown capturing an interior of the ego vehicle 50 (e.g., detecting the driver 202). A targeted view of the driver 202 (e.g., represented by a line 204a and a line 204b) is shown being captured by the capture device 102a. The capture device 102a may also detect other objects in the ego vehicle 50 (e.g., a seat, a head rest, an arm rest, a rear window, a seatbelt, a center console, other occupants, etc.). By analyzing video of the driver 202 and/or other occupants of the ego vehicle 50 (e.g., extracting video data from the captured video), the processors 106a-106n may determine a body position and/or body characteristics (e.g., a distance, orientation and/or location of the body and/or head) of one or more occupants of the ego vehicle 50 and/or objects within the ego vehicle 50.

In some embodiments, more than one of the capture devices 102a-102n may be used to capture video data of the driver 202 and/or other occupants of the ego vehicle 50. A combination of inputs from the signals FRAMES_A-FRAMES_N may be used to detect changes in head/face movements and/or body positions. For example, using multiple cameras (e.g., stereo cameras) may improve the accuracy of depth information. The number of cameras used and/or the type of data extracted from the video data from the driver monitoring cameras may be varied according to the design criteria of a particular implementation.

A camera (e.g., a combination of the lens 112c and the capture device 102c) is shown capturing a targeted view from the ego vehicle 50. In the example shown, the targeted view from the ego vehicle 50 (e.g., represented by a line 206a and a line 206b) is shown capturing an exterior view to the rear of (e.g., an area behind) the ego vehicle 50. Similarly, other cameras may be used to capture video data of a targeted view from the vehicle (e.g., shown as the lens 112c and the camera sensor 102c, the lens 112d and the camera sensor 102d, etc.). For example, the targeted view (e.g., represented by a line 208a and a line 208b) may provide a front exterior view of an area. The number of cameras implemented, a direction captured, an orientation of the cameras and/or an arrangement of the cameras may be varied according to the design criteria of a particular implementation.

The capture devices 102a-102n may be configured to capture video data of the environment around (e.g., area near) the ego vehicle 50. The processors 106a-106n may implement computer vision to detect objects and/or understand what is happening near the ego vehicle 50 (e.g., see the environment as a human driver would see the environment). The sensors 114 may be implemented using proximity detection technology. For example, the vehicle sensors 114 may implement a radar device, an array of radars, a sonar device, an array of sonars, a LIDAR device, an array of LIDAR devices, an ultra-sound device, an array of ultra-sound devices, etc.

The sensor fusion module 152 may aggregate data from the sensors 114, the CNN module 150 and/or the video pipeline 156 to build a model and/or abstraction of the environment around the ego vehicle 50. The computer vision operations may enable the processors 106a-106n to understand the environment, a state of objects, relative positions of objects and/or a meaning of objects to derive inferences (e.g., detect that the state of a streetlight is red, detect that a street sign indicates the ego vehicle 50 should stop, understand that a pedestrian is walking across the street from right to left, understand that brake lights of a vehicle ahead indicate that the vehicle is slowing down, etc.). The sensor fusion module 152 may enable a comparison and/or cross-reference of the data received from the vehicle sensors 114 at a particular time to the video data captured at another particular time in order to adjust a confidence level of an inference. The type of inferences made by the processors 106a-106n may be varied according to the design criteria of a particular implementation.

Figure 3:
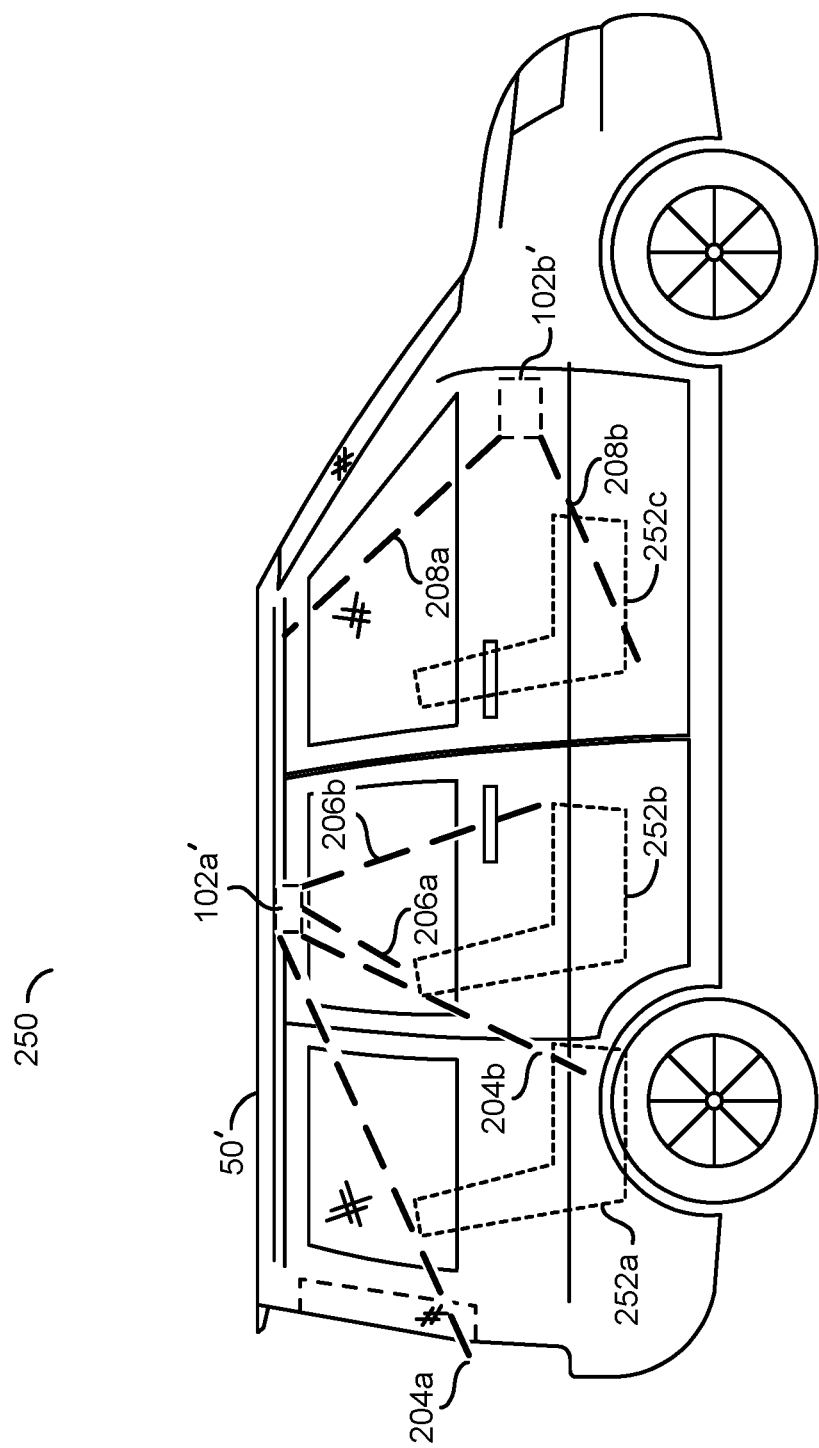
FIG. 3 is a diagram illustrating an example of interior camera systems configured to monitor vehicle occupants.

Referring to FIG. 3, a diagram illustrating an example 250 of interior camera systems configured to monitor vehicle occupants is shown. Various camera angles of an interior of the ego vehicle 50' are shown. Multiple rows of seats 252a-252c are shown in the ego vehicle 50'. Each of the rows of seats 252a-252c may be monitored to detect and/or classify one or more occupants of the ego vehicle 50'. The apparatus 100 may be configured to adjust a position of one or more seats in the rows of seats 252a-252c.

The capture device 102a' is shown mounted on a ceiling of the vehicle 50'. The capture device 102a' is shown having an angle 204a and an angle 204b (e.g., a field of view) that points toward the back row of seats 252a. The capture device 102a' may also have a field of view angle 206a-206b to capture the middle row of seats 252b. In another example, the capture device 102a' may implement a wide angle lens to capture both rows of seats. The field of view from the angle 204a and the angle 204b may provide a targeted view of the interior of the vehicle 50'. Similarly, the capture device 102b' may capture an interior of the vehicle 50'. An angle 208a and an angle 208b may represent a field of view capturing the front row of seats 252c. The multiple fields of view captured by the capture devices 102a'-102n' may be a targeted wide angle view of the interior of the vehicle 50'. The number of angles and/or fields of view may be varied according to the design criteria of a particular implementation.

The processors 106a-106n may be configured to analyze the captured video signal. The processors 106a-106n may detect objects in the captured video signal of the exterior of a vehicle (e.g., automobiles, bicycles, pedestrians, animals, parking spaces, etc.) and/or of an interior of a vehicle (e.g., the driver 202, other occupants, physical characteristics of people in the vehicle, facial expressions of people in the vehicle, fields of view of the people in the vehicle, etc.). The processors 106a-106n may be configured to determine a presence, an absolute location and/or a relative location of the detected objects. Based on the detected objects, the processors 106a-106n may determine a position (e.g., a distance) of the objects relative to the vehicle and/or a position of the objects relative to a component of the vehicle (e.g., distance from a vehicle pillar, distance from a steering wheel, distance from a dashboard, distance from another seat, etc.).

The decision making module 158 may make a decision based on data received at various inputs and/or various data inferred by the processors 106a-106n. For example, the data received may comprise external signals generated in response to user input, external signals generated by the sensors 114 and/or internally generated signals such as signals generated by the processors 106a-106n in response to analysis of the video data and/or objects detected in video data.

The processors 106a-106n may process video data that may not be seen by a person (e.g., not output to the displays 118a-118n). For example, the video data may be internal to the processors 106a-106n. Generally, the processors 106a-106n perform the computer vision operations in order to interpret the environment to emulate how a person would see the environment and/or provide greater sensory capability than a human. For example, the processors 106a-106n may interpret the environment in many directions at once (e.g., a 360 degree field of view) while a person has a limited field of view.

The video analytics performed by the processors 106a-106n may be performed on more than one video frame. For example, the processors 106a-106n may analyze a series (or sequence) of video frames. In some embodiment, the processors 106a-106n may be configured to generate motion vectors to track the movement of objects across video frames temporally. The motion vectors may indicate a direction and/or speed of movement of an object between a current video frame and previous video frames. Tracking movements of objects may enable determining gestures (e.g., to receive input commands), determine a vulnerability of an occupant (e.g., a non-moving occupant may be asleep and/or unconscious) and/or determine an expected path of a detected object (e.g., determine speed, acceleration and direction to determine a trajectory). The expected path may be further determined based on context such the type of object and/or the shape of the roadway (e.g., a vehicle with a straight trajectory will likely follow the curve of a roadway instead of continuing to drive straight off the road). In another example, tracking a static object across video frames temporally may be implemented to determine a status of an object. For example, the windshield may be tracked over time to determine that visibility has been reduced and/or increased (e.g., due to frost forming and/or disappearing).

In some embodiments, the processors 106a-106n may implement depth-sensing techniques. The depth-sensing techniques may compare knowledge of the dimensions of the ego vehicle 50' to the location and/or body position of the occupants. The processors 106a-106n may cross-reference a body position of the occupants with a location of the components of the vehicle (e.g., how far away the driver is from the steering wheel).

In some embodiments, the video analytics may process the captured video frames for biometric markers to determine a vulnerability of the occupants of the ego vehicle 50'. For example, one or more of age, height and/or weight may be the determined biometric markers. The biometric markers may be used to differentiate between a child, an adolescent, a pregnant woman, a young adult, teenager, adult, etc. Feature maps may be detected and/or extracted while the video data is processed in the pipeline module 156 to generate inferences about body characteristics to determine age, gender, and/or condition (e.g., wrinkles, facial structure, bloodshot eyes, eyelids, signs of exhaustion, etc.).

The processors 106a-106n may be configured to detect faces in a region of a video frame. In some embodiments, facial recognition may be implemented (e.g., based on faces stored as references in the memory 108 and/or an external database accessible by the communication devices 110). In some embodiments, the processors 106a-106n may be configured to detect objects and classify the objects as a particular type of object (e.g., an elderly person, a child, an animal, etc.).

The processors 106a-106n may implement a "diagnosis" and/or a confidence level for recognizing and/or classifying the objects. In some embodiments, the sensor fusion module 152 may be used to combine information from the sensors 114 to adjust the confidence level (e.g., using a weight sensor in the seat to confirm that the weight of the object is consistent with a person, using temperature sensor readings to confirm that body heat is detected, using seat position preferences to confirm a known occupant, comparing a determined object location exterior to the vehicle with V2X information, etc.).

The processors 106a-106n may determine a type of the detected objects based on a classification. The classification may be based on information extracted from the video data and/or information from the sensors 114 (e.g., environmental factors). For example, the color histogram, the high frequency component and/or video analytics of the video data may be compared to some known reference. In another example, temperature and/or humidity information may be provided by the sensors 114 (e.g., to distinguish a cold person from a hot person). The processors 106a-106n may rule out and/or increase a likelihood of certain types of objects. For example, the classification may comprise a confidence level for a particular hypothesis (or diagnosis) about the condition (e.g., capability) of the detected objects. When the confidence level is above a pre-determined threshold value, the classification may be considered to be confirmed by the processors 106a-106n.

A high confidence level for a particular type of object may indicate that evidence is consistent with the particular type of object. A low confidence level for a particular type of object may indicate that evidence is inconsistent with the particular type of object and/or not enough evidence is available yet. Various checks may be performed to determine the confidence level. The implementation of the classification and/or confidence level to determine the type of object may be varied based on the design criteria of a particular implementation.

The computer vision operations may be one type of video analysis performed by the processors 106a-106n. The processors 106a-106n may be configured to determine a current size, shape and/or color of the objects (e.g., to perform a classification). One or more of the objects may be detected in each video frame. The processors 106a-106n may determine a number of pixels (e.g., a width, a height and/or a depth) comprising the detected objects in each video frame portion of a video frame and/or region of a video frame. Based on the number of pixels of each of the detected objects in the video frame, the processors 106a-106n may estimate a classification of the detected objects and/or adjust the confidence level.

The computer vision operations may be performed on video frames received from the various capture devices 102a-102n. The capture devices 102a-102n may comprise various types of cameras (e.g., IR, depth measuring cameras such as stereo, time-of-flight and/or structured light cameras, Bayer cameras, RCCB, RCCC, etc.). The computer vision operations may be performed on the video frames FRAMES_A-FRAMES_N generated by various configurations of the capture devices 102a-102n. In one example, the computer vision operations may be performed based on video frames captured by a single camera. In another example, the computer vision operations may be performed based on video frames captured by multiple cameras configured to capture images of different locations. The sensor fusion module 152 may enable the computer vision operations to be supplemented by the user of the sensors 114 (e.g., radar, occupancy sensors, temperature sensors, location/orientation sensors, etc.). The type of capture devices implemented may be varied according to the design criteria of a particular implementation.

The memory 108 may store the pre-determined locations and/or a pre-determined field of view of each of the capture devices 102a-102n. The memory 108 may store reference data corresponding to the objects. For example, the memory 108 may store reference color histograms about various known types of objects. In another example, the memory 108 may store previously captured frames (e.g., a reference image from when the ego vehicle 50' was parked, when the ego vehicle 50' came out of production, a reference image from when a car was in operation, turned off, left unattended, etc.). The type of reference information stored by the memory 108 may be varied according to the design criteria of a particular implementation.

The CNN module 150 may be configured to "train" the processors 106a-106n to know (e.g., store in the memory 108) the objects and/or expected locations (or areas) that the objects may detect in a video frame. The video analytics performed by the processors 106a-106n may determine whether the detected objects are exterior to or interior to the ego vehicle 50'. The processors 106a-106n may be configured to respond differently to different types of objects. For example, if the classified object is a person, the processors 106a-106n may be further configured to estimate the age of the person via video analytics. For example, the video analytics may be configured to tell the difference between a small child (or incapacitated person), an elderly person and/or an able-bodied adult.

The video analytics may be configured to determine reference objects. For example, the CNN module 150 may be trained to recognize when a car seat is empty. In another example, the CNN module 150 may be configured to recognize when a child, person, pet and/or a type of inanimate object is present in the seat. Comparing the seat in the current video frame to a reference empty seat may enable the processors 106a-106n to detect the presence of occupants even if there is no motion by the occupants.

The processors 106a-106n may determine the width of the reference objects (e.g., based on the number of pixels occupied in the video frame). The memory 108 may store (e.g., in the look up table 170) the width of the reference objects. The processors 106a-106n may determine the width of the reference objects (e.g., the number of pixels in the video frame). The width of the current size of the reference object may be compared to the stored width of the reference object to estimate a distance of the occupants of the ego vehicle 50 from the lens 112a-112n. For example, a number of pixels may be measured between the reference object and the head of the driver 202 to determine location coordinates of the head of the driver 202.

In some embodiments, the processors 106a-106n may determine the position (e.g., 3D coordinates and/or location coordinates) of various features (e.g., body characteristics) of the occupants of the ego vehicle 50. In one example, the location of the arms, legs, chest and/or eyes may be determined using 3D coordinates. One location coordinate on a first axis for a vertical location of the body part in 3D space and another coordinate on a second axis for a horizontal location of the body part in 3D space may be stored. In some embodiments, the distance from the lenses 112a-112n may represent one coordinate (e.g., a location coordinate on a third axis) for a depth location of the body part in 3D space. Using the location of various body parts in 3D space, the processors 106a-106n may determine body position, body characteristics and/or the vulnerability of the occupants.

In some embodiments, the processors 106a-106n may be configured to approximate the gaze of the driver 202. For example, the drowsiness and/or attentiveness of the driver 202 may be detected (e.g., recognizing that eyes are closing, recognizing that the head is drifting down, etc.). In another example, the processors 106a-106n may present the recording of the driver 202 to one of the displays 118a-118n (e.g., as a live stream for use in teleconferencing). The processors 106a-106n may be configured to recognize the driver 202 through facial recognition.

The memory 108 (e.g., the look up table 170) may store a reference size (e.g., the number of pixels of a particular reference object in a video frame at a known distance) of particular objects. In another example, the memory 108 may store a reference shape (e.g., an arrangement of pixels of the reference object in the video frame at a known distance). In yet another example, the memory 108 may store a reference color (e.g., a RGB value and/or a YCbCr value for each of the pixels of the reference object in the video frames). The processor 106a-106n may compare the shape, size and/or colors of the reference object to detected objects in the current video frame. The comparison of the size, shape and/or color of the detected objects in the current video frame and the reference size may be used to determine the location coordinates, rotation, orientation and/or movement direction of the objects.

In some embodiments, the lenses 112a-112n and/or the capture devices 102a-102n may be configured to implement stereo vision. For example, the lenses 112a-112n and/or the capture devices 102a-102n may be arranged to capture multiple perspectives of a location. Using the multiple perspectives, the processors 106a-106n may generate a depth map. The depth map generated by the processors 106a-106n may be used to estimate depth, provide 3D sensing and/or provide an immersive field of view with a 3D effect (e.g., a spherical field of view, an immersive field of view, a 360 degree field of view, less than a 360 degree field of view, etc.).

In some embodiments, the processors 106a-106n may analyze reference video frames. Reference video frames may be used by the processors 106a-106n to classify, analyze and/or store reference objects. The reference objects may be used by the processors 106a-106n to compare with objects captured in newly acquired (e.g., current) video frames. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. In one example, a distance to an object may be determined by comparing a number of pixels occupied by a particular object in the reference frame to the number of pixels occupied by the object in the current video frame. The types of reference objects and/or characteristics of the reference objects may be varied according to the design criteria of a particular implementation.

In some embodiments, the processors 106a-106n may compare the current video frame to the reference video frame. In some embodiments, the current video frame may not be directly compared to the reference video frame. For example, the CNN module 150 may implement deep learning to gather information and/or statistics about various features of objects. The CNN module 150 may determine features of objects and/or sub-objects corresponding to the current video frame. The processors 106a-106n may compare the features extracted from the current video frame to features extracted from numerous reference video frames. For example, the reference video frame and/or the current video frame may be used as training data for the CNN module 150. The types of features extracted from video frames to perform the computer vision analysis may be varied according to the design criteria of a particular implementation.

Referring to FIG. 4, a diagram illustrating an object comparison between a reference video frame and a captured video frame is shown. The reference video frame 300 and the current video frame 300' may be video frames processed by the processors 106a-106n (e.g., generated in response to the signals FRAMES_A-FRAMES_N by one of the capture devices 102a-102n). The reference video frame 300 and the current video frame 300' may be a targeted view directed towards the interior of the vehicle 50. In an example, the lens 112a mounted on the dashboard of the vehicle 50 may capture the reference video frame 300 and the current video frame 300'. The view captured for each of the video frames may be varied according to the design criteria of a particular implementation.

The reference video frame 300 may be a video frame captured at an earlier time than the current video frame 300'. For example, the reference video frame 300 may be stored in the memory 108 (e.g., in the data storage portion 172). In some embodiments, the reference video frame 300 may be pre-loaded in the apparatus 100. For example, the reference video frame 300 may be captured by implementing fleet learning (e.g., to be described in more detail in association with FIG. 5). In some embodiments, the reference video frame 300 may be captured when the vehicle 50 is idle and/or turned off. In some embodiments, the reference video frame 300 may be captured periodically. The method of capturing the reference video frame (or frames) 300 may be varied according to the design criteria of a particular implementation.

The reference video frame 300 shown may be a representative example of one or more reference video frames implemented by the apparatus 100. In an example, reference video frames 300 may be captured for many different scenarios and/or locations within or outside of the vehicle 50. For example, the reference video frames 300 may be captured for a driver seat, a passenger seat, for each seat of the rows 252a-252c, the interior of the vehicle 50, the exterior of the vehicle 50, etc. Generally, the reference video frame 300 is used by the processors 106a-106n to classify, analyze and/or store reference objects. The reference objects may be used by the processors 106a-106n to compare with objects captured in the current video frame 300'. The reference objects may be used to provide objects having known characteristics such as sizes, shapes, colors, feature maps, edges, color histograms, contrasts, orientations, etc. The characteristics of the reference objects may be used as a comparison point for detecting, recognizing and/or classifying objects in the computer vision operations. The types of reference objects and/or characteristics of the reference objects may be varied according to the design criteria of a particular implementation.

In the example reference video frame 300, a reference object 302 is shown. In the example shown, the reference object 302 may be a head rest of the driver side seat. The CNN module 150 may determine the width (e.g., D_REF) of the reference object 302 (e.g., based on the number of pixels occupied in the reference video frame 300). In some embodiments, the look up table 170 may store the width D_REF. The width D_REF may be determined when the reference object 302 is at a known distance from the lens 112a.

In the example reference video frame 300, a reference object 304 is shown. In the example shown, the reference object 304 may be a driver seat belt. The CNN module 150 may determine a location of the seat belt 304 (e.g., a location based on a horizontal and/or vertical pixel count). In some embodiments, sensors 114 may provide an indication of the status of the seat belt 304 (e.g., clicked into place, unused, etc.). The sensor fusion module 152 may use the computer vision data from the CNN module 150 and/or the readings of the sensors 114 to determine a confidence level of the status of the seat belt 304. In the example shown, the reference video frame 300 may provide a reference for when the status of the seat belt 304 is unused (e.g., not being worn by a passenger/driver).

In the example reference video frame 300, a reference object 310 is shown. In the example shown, the reference object 310 may be an unoccupied seat. For example, the CNN module 150 may recognize color, shape, distance, stitching, design, etc. of the reference object 310.

The current video frame 300' may be one or more video frames analyzed by the processors 106a-106n (e.g., a video frame within the video pipeline 156). The current video frame 300' may be analyzed by the processors 106a-106n in real time (e.g., within approximately 500 ms). The CNN module 106a-106n may perform a computer vision analysis on the current video frame 300' and/or compare features and/or characteristics of the current video frame 300' to one or more reference video frames.

The current video frame 300' shows the vehicle 50, the driver 202, the detected object 302', the detected object 304' and/or the detected object 310'. In the current video frame 300', the head rest 302' may be closer to the lens 112a than in the reference video frame 300. In the current video frame 300', the status of the seat belt 304' may be determined to be worn by the driver 202 (e.g., detected across the chest of the driver 202). In the current video frame 300', the detected object 310' may be the driver 202 sitting in the driver seat (e.g., an object covering the details of the empty seat 310 in the reference video frame 300). The processors 106a-106n may detect and/or determine characteristics of various sub-objects of the detected object 310'. In an example, the processors 106a-106n may identify sub-objects such as the eyes of the driver 202, locations of the arms and hands (e.g., holding the steering wheel), location of the hands on the steering wheel (e.g., at the ten and two position of the steering wheel) an angle of the head, a rotation of the head, field of view of the driver (e.g., direction of the eyes), body rotation, body lean, body orientation, a color of clothing, etc.

In some embodiments, one or more of the reference objects (e.g., the head rest 302) may be physically connected to the vehicle 50. In an example, the reference objects may be an arm rest, a steering wheel, the rear seat row 252n, a dashboard, a sunroof and/or a moon roof. The reference object 302 may be a vehicle component that is capable of relative movement with respect to the lens 112a. In some embodiments, the reference object (e.g., the head rest 302) may be used to determine a distance of the driver 202 from the lens 112a (e.g., objects that correlate to where the driver 202 is seated).

For example, if the headrest 302' is determined to be 4.5 feet away (e.g., by comparing the current size D_CURRENT to the reference size D_REF to infer a distance) from the lens 112a then an average sitting posture and head size may be used to estimate that the eyes of the driver 202 may be 3.5 feet from the lens 112a. In another example, the capture device 102a may implement depth-sensing technology to determine how far away the driver 202 is from the lens 112a. In yet another example, stereo video processing may be implemented by the processors 106a-106n to generate a depth map to determine how far away the driver 202 is from the lens 112a. Using the depth information and/or a horizontal and vertical position of the detected object 310', the processors 106a-106n may determine the position (e.g., 3D coordinates and/or location coordinates) of the driver 202 and/or particular body parts of the driver 202.

In some embodiments, the processors 106a-106n may compare the current video frame 300' to the reference video frame 300. In some embodiments, the current video frame 300' may not be directly compared to the reference video frame 300. For example, the CNN module 150 may implement deep learning to gather information and/or statistics about various features of objects. The CNN module 150 may determine features of objects corresponding to the current video frame 300'. The processors 106a-106n may compare the features extracted from the current video frame 300' to features extracted from numerous reference video frames. For example, the reference video frame 300 and/or the current video frame 300' may be used as training data for the CNN module 150. The types of features extracted from video frames to perform the computer vision analysis may be varied according to the design criteria of a particular implementation.

Figure 5:
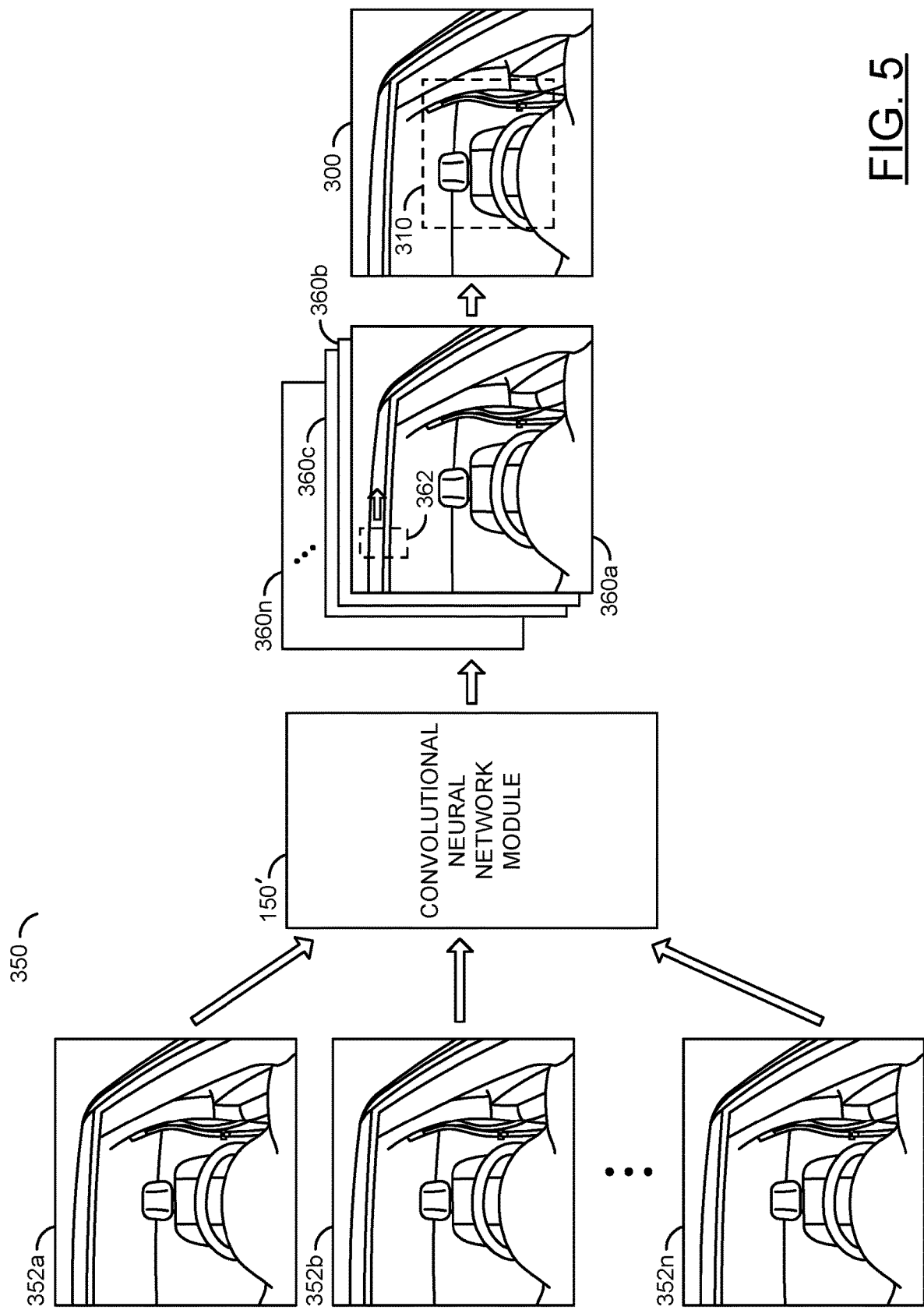
FIG. 5 is a diagram illustrating an example visualization of training a convolutional neural network for object detection using fleet learning.

Referring to FIG. 5, a diagram illustrating an example visualization 350 of training a convolutional neural network for object detection using fleet learning is shown. To detect objects using computer vision, the convolutional neural network 150' may be trained using training data 352a-352n. The training data 352a-352n may comprise a large amount of information (e.g., input video frames). The information for the training data 352a-352n may be received using the video data (e.g., the signals FRAMES_A-FRAMES_N) processed by the video pipeline module 156.

While the apparatus 100 is in operation, the CNN module 150 may continually learn using new video frames as the input training data 352a-352n. However, the processors 106a-106n may be pre-trained (e.g., configured to perform computer vision before being installed in the vehicle 50). For example, the results of training data 352a-352n may be pre-programmed and/or loaded into the processors 106a-106n. In some embodiments, the signal CV generated by the processors 106a-106n may be sent to the interface 104 to enable the communication devices 110 to upload computer vision information (e.g., to a centralized service and/or peer-to-peer communication). Similarly, the communication devices 110 may receive computer vision data and the interface 104 may generate the signal CV in order to update the CNN module 150.

In some embodiments, fleet learning may be implemented to gather large amounts of the training data 352a-352n. For example, cameras may be installed in production facilities (e.g., at the end of the production line) to capture many reference images of different types of vehicles to be used as the training data 352a-352n. In the example shown, the training data 352a-352n may capture an interior of a vehicle. In another example, the training data 352a-352n may be a sequence of video frames of a person talking on a cellular phone while driving. In yet another example, the training data 352a-352n may be various video frames of people of different ages. Using the training data 352a-352n (e.g., video frames captured from many different vehicles as the vehicles are produced), many training data sets may be available to train the CNN module 150'. In an example, different makes and models may be analyzed. In another example, different interior colors may be analyzed. In yet another example, different drivers (e.g., different people) talking while holding various models of smartphones may be analyzed. In some embodiments, the training data 352a-352n may be uploaded to a central CNN module 150' to perform and/or train the computer vision. The results of the training from the central CNN module 150' may be installed on each of the CNN modules 150 of each apparatus 100 (or transmitted while the apparatus 100 is in operation to remotely provide updates via the communication devices 110).

The CNN module 150' may receive the training data 352a-352n. To perform the training and/or the computer vision operations, the CNN module 150' may generate a number of layers 360a-360n. On each one of the layers 360a-360n, the CNN module 150' may apply a feature detection window 362. In an example, the feature detection window 362 is shown on a portion of the layer 360a. A convolution operation may be applied by the CNN module 150' on each of the layers 360a-360n using the feature detection window 362.

The convolution operation may comprise sliding the feature detection window 362 along the layers 360a-360n while performing calculations (e.g., matrix operations). The feature detection window 362 may apply a filter to pixels and/or extract features associated with each layer 360a-360n. The feature detection window 362 may be applied to a pixel and a number of surrounding pixels. In an example, the layers 360a-360n may be represented as a matrix of values representing pixels and/or features of one of the layers 360a-360n and the filter applied by the feature detection window 362 may be represented as a matrix. The convolution operation may apply a matrix multiplication between the region of the current layer covered by the feature detection window 362. The convolution operation may slide the feature detection window 362 along regions of the layers 360a-360n to generate a result representing each region. The size of the region, the type of operations applied by the filters and/or the number of layers 360a-360n may be varied according to the design criteria of a particular implementation.

Using the convolution operations, the CNN module 150' may compute multiple features for pixels of an input image in each extraction step. For example, each of the layers 360a-360n may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window 362 operates on a pixel and nearby pixels, the results of the operation may have location invariance. The layers 360a-360n may comprise convolution layers, pooling layers, non-linear layers and/or fully connected layers. In an example, the convolution operations may learn to detect edges from raw pixels (e.g., the first layer 360a), then use the feature from the previous layer (e.g., the detected edges) to detect shapes in a next layer (e.g., 360b) and then use the shapes to detect higher-level features (e.g., facial features) in higher layers and the last layer may be a classifier that uses the higher level features.

Using the input video frames as the training data 352a-352n, the CNN module 150' may be trained. The training may comprise determining weight values for each of the layers 360a-360n. For example, weight values may be determined for each of the layers 360a-360n for feature extraction (e.g., a convolutional layer) and/or for classification (e.g., a fully connected layer). The weight values learned by the CNN module 150' may be varied according to the design criteria of a particular implementation.

The CNN module 150' may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 150' to extract features from the training data 352a-352n may be varied according to the design criteria of a particular implementation.

The CNN module 150' may consume input images (e.g., the training data 352a-352n) that have multiple color channels (e.g., a luminance channel and two chrominance channels). A color detection process implemented by the video pipeline module 156 may be implemented to output images with color likelihood (or probability) values for a particular color at one or more pixel locations in the input images. For example, shared buffers between the video pipeline module 156 and/or the CNN module 150' may enable information sharing between components of the processors 106a-106n.

The color detection process may be used to extract features from the training data 352a-352n.

The color detection and/or feature extraction process is generally operational to determine a color likelihood value that pixels in each pixel location of an input image (e.g., the training data 352a-352n during training and/or input video frames) have a specific color. In various embodiments, the specific color may be the shade of yellow used in streets and highways to identify the center and/or edges of traffic lanes and/or other road marks. In other embodiments, the specific color may be the shade of white used on the streets and highways for similar reasons. Generally, the specific color may be any color commonly applied to roadway markings, traffic lights and/or traffic signs.

The color feature extraction may also detect colors that are commonly associated with pavement repair, such as black asphalt. A result of the color feature extraction may be a set of multiple (e.g., 16) features for each pixel of interest. The input image is typically generated by warping an original image taken by an on-dash mounted camera (e.g., the capture device 102a and/or the lens 112a) through an inverse perspective mapping.

The CNN module 150' may implement a color classification operation. The color classification operation may determine a color likelihood value for one or more pixel locations in the input images. The color likelihood values generally define a probability that a particular pixel location is approximately similar to or matches the specified color (e.g., red, green, yellow or white). The results of the color classification operation may be arrays (or probability maps) of color likelihood values that indicates a confidence in the color at each pixel location. In some embodiments, pixel locations different from the specified color may be segmented out of the map by applying a threshold to each color likelihood value. For example, the color likelihood values below a threshold (e.g., pixels below the top N % classification probability) may be set to a default probability value (e.g., zero).

In some embodiments, the feature extraction window 362 may be considered by the color detection process on one of the layers 360a-360b. The feature extraction window 362 may consider a pixel of interest. In an example, the pixel of interest may be a current pixel location being color classified. The feature extraction window 362 may generally represent a local context and contrast around the pixel of interest.

The pixels of the training data 352a-352n may each be represented as components in multiple color channels. In some designs, the color channels may include a luminance channel (e.g., A) and two chrominance channels (e.g., B and C). In various embodiments, the channels ABC may be representative of YUV, YCbCr, YPbPr, RGB, sRGB or YIQ color models. Other color models may be implemented to meet the design criteria of a particular application.

In various embodiments, the CNN module 150' may implement a common Adaboost classifier technique. Specifically, the Adaboost classifier technique combines multiple (e.g., Z) weak depth-two decision trees in a cascade to form a strong classifier. During training, each node of the weak classifiers may select one of the Z features that best separates training samples of different categories. The determination process may generate the color likelihood values that indicate a confidence in the color at each pixel location. Other classifier techniques may be implemented to meet the design criteria of a particular application.

The CNN module 150' generally provides a feature descriptor technique with multiple (e.g., 16) discriminative features that may be efficiently computed. When combined with the Adaboost classifier process, the feature descriptor may achieve good object (e.g., lane marking detection) and color classification accuracy. The simplicity and efficiency of the color detection technique may be well suited for embedded environments and time-critical applications, such as self-driving car. The color detection method is generally a learning-based solution trained off-line from tens of thousands of images, taken under many different scenarios and lighting conditions, and annotated by human experts for lane markings, and is therefore robust.

Using fleet learning, the CNN module 150' may generate one or more reference video frames 300. The reference video frame 300 may comprise masks and/or categorized instances of the reference objects 310. The reference objects 310 may be objects that have been sufficiently defined to enable reliable recognition using computer vision.

The processors 106a-106n may generate images that provide better image processing that allows "seeing" objects in very challenging environments (e.g., very dark and/or bright sun into the camera). The processors 106a-106n may provide hardware acceleration that allows operating on higher resolution and/or running more sophisticated computer vision techniques. High resolution video and sophisticated computer vision operating in real time are relevant to in-cabin use cases. The computer vision operations performed by the CNN module 150' may determine a size, shape, orientation and/or arrangement of a recognized object.

By analyzing a number of video frames in sequence, the computer vision operations performed by the CNN module 150' may determine a trajectory of a recognized object. The computer vision operations may be configured to analyze and/or understand (e.g., interpret, translate, etc.) the digital video to extract and/or produce numerical and/or symbolic information about the digital video. The numerical and/or symbolic information may enable other components to interpret the visual information analyzed by the CNN module 150'.

Figure 6:
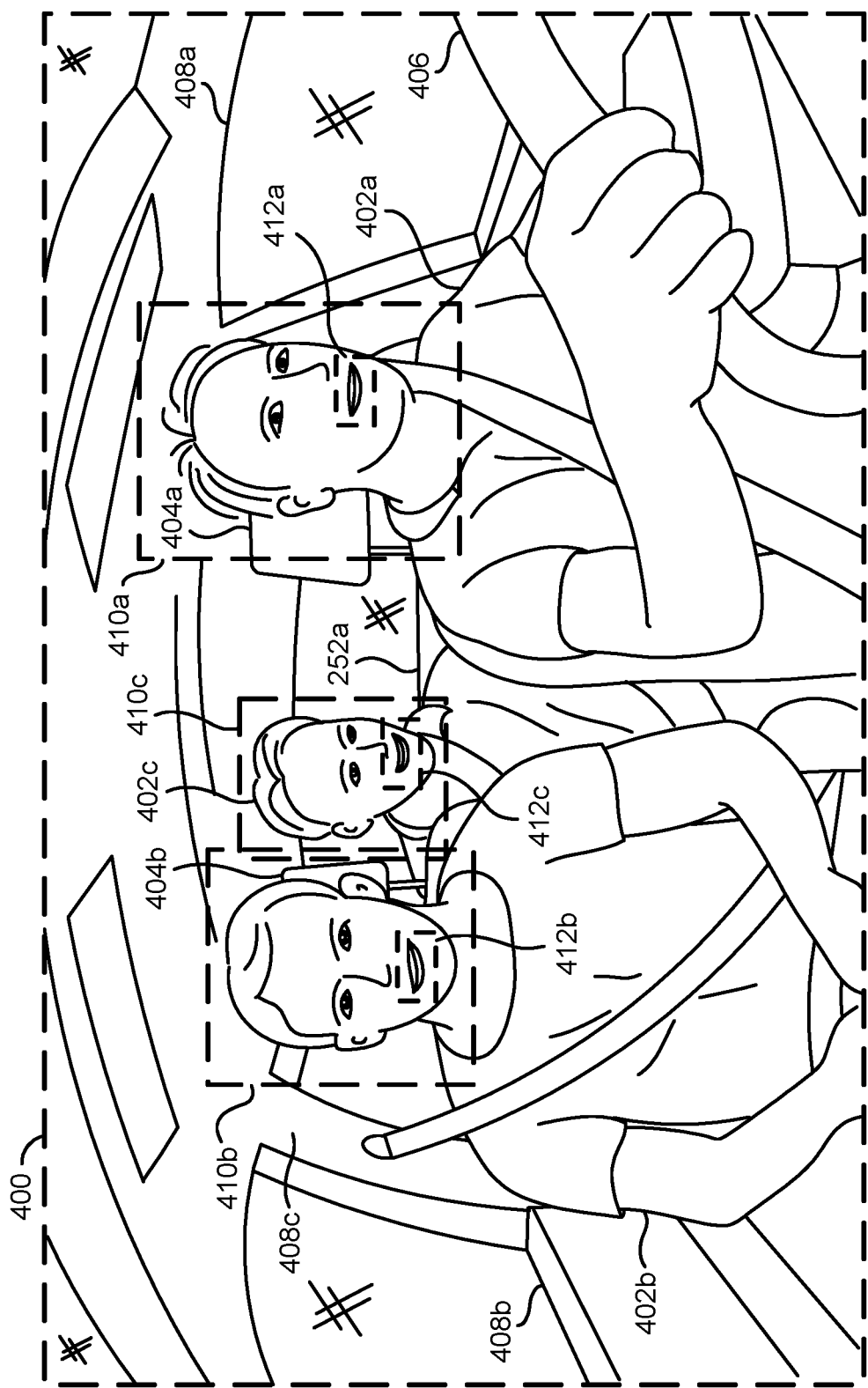
FIG. 6 is a diagram illustrating an example of a processor analyzing a video frame for characteristics of passengers in a vehicle cabin.

Referring to FIG. 6, a diagram illustrating the processors 106a-106n analyzing characteristics of passengers in a video frame of a vehicle cabin is shown. A video frame 400 is shown. Occupants 402a-402c are shown within the vehicle cabin in the video frame 400. In the example video frame 400 three occupants are shown. However, any number of occupants (e.g., 402a-402n, not shown), may be within the interior of the vehicle 50. In some embodiments, the video frame 400 may be captured by a driver monitoring system.

The video frame 400 may be a video frame captured by one or more of the capture devices 102a-102n of the interior of the vehicle 50. One or more of the capture devices 102a-102n may be configured as a cabin monitoring system (e.g., directed to the interior of the vehicle 50 to monitor the passengers). In one example, the lens 112a of the capture device 102a may implement a wide angle lens configured to capture a wide angle field of view of the interior of the vehicle 50. For example, the processors 106a-106n may be configured to perform video de-warping operations on potential distortions caused by the wide angle lens 112a before performing the computer vision operations. In another example, the video frame 400 may be created by stitching together video frames captured at the same time by more than one of the capture devices 102a-102n. For example, the processors 106a-106n may be configured to perform video stitching operations to combine multiple video frames together in order to generate the video frame 400 before performing the computer vision operations. Capturing a wide angle view and/or generating a stitched view of the interior of the vehicle 50 may enable the processors 106a-106n to analyze a view showing more than one of the occupants 402a-402n of the vehicle 50. The method of capturing the wide angle video frame 400 may be varied according to the design criteria of a particular implementation.

In the example video frame 400, a number of occupants 402a-402c, a number of seats 404a-404b, the bench seat 252a and/or a steering wheel 406 are shown. For example, the driver 402a is shown in the driver seat 404a, the passenger 402b is shown in the passenger seat 404b and the occupant 402c is shown in a seat on the back row 252a (e.g., a bench seat). The CNN module 150 may be configured to detect various objects in the video frame 400. In an example, the computer vision operations may detect the steering wheel 406 (or other features of the interior of the vehicle 50). In another example, the computer vision operations may detect the driver seat 404a, the passenger seat 404b and/or the back row bench seat 252a. In some embodiments, the processors 106a-106n may determine whether the occupant 402a or 402b is the driver 202 in response to the detected location of the steering wheel 406 (e.g., left side steering wheel or right side steering wheel).

Location references 408a-408n are shown in the interior of the vehicle 50. The location references 408a-408n may be objects detected by the CNN module 150 that may be used as a reference point for determining a location within the ego vehicle 50. The location references 408a-408n may be generally static objects (e.g., objects that do not move, objects that only have a few positions, objects that move within a predefined range, etc.). The location reference 408a may be the driver side window (or door). The location reference 408b may be the passenger side door (or window). The location reference 408c may be a pillar of the vehicle 50 (e.g., a part of the vehicle frame). Other objects may be used as the location references 408a-408n. In an example, the steering wheel 406 may be one of the location references 408a-408n. In another example, one or more of the seats 404a-404n may be one of the location references 408a-408n. The types of objects that may be used as the location references 408a-408n may be varied according to the design criteria of a particular implementation.

Dotted boxes 410a-410c and dotted boxes 412a-412c are shown. The dotted boxes 410a-410c and the dotted boxes 412a-412c may represent a detected object and/or group of objects detected by the CNN module 150. The objects 410a-410c and/or the objects 412a-412c may be detected by the video operations performed by the processors 106a-106n used to detect objects in the video frames FRAMES_A-FRAMES_N. In an example, the CNN module 150 may extract features from the video frame 400 and compare the extracted features to known features (e.g., features extracted from the training data 352a-352n).

The objects 410a-410c and the objects 412a-412c detected by the processors 106a-106n may be objects comprising faces, body parts and/or heads of the occupants 402a-402c. In the example shown, the objects 410a-410c may be faces of the occupants 402a-402c. However, the computer vision operations performed by the processors 106a-106n may analyze and/or characterize any combination of body parts of the occupants 402a-402c (e.g., shoulders, chest, legs, etc.). Since the processors 106a-106n may be configured to detect which of the occupants 402a-402c are speaking by analyzing mouth movements, the CNN module 150 may detect the faces 410a-410c.

The objects 412a-412c detected by the processors 106a-106n may be mouths of the occupants 402a-402c. The mouths 412a-412c may be a subset of the detected faces 410a-410c. The processors 106a-106n may be configured to limit a search region of the video frame 400 to detect an object that is a subset of another object. In one example, the processors 106a-106n may be configured to detect the faces 410a-410c in the video frame 400 first and then search the region of the video frame 400 that corresponds to the faces 410a-410c in order to detect the mouths 412a-412c (e.g., the mouths 412a-412c would not be located in a region of the video frame 400 that is not one of the faces 410a-410c). Limiting the search region for an object that is a subset of another object may reduce the amount of processing to detect a particular object.

The processors 106a-106n may use the detected objects 410a-410c and/or the objects 412a-412c to locate the occupants 402a-402c within the vehicle 50. For example, the face 410a may correspond to the occupant 402a, the face 410b may correspond to the occupant 402b and the face 410c may correspond to the occupant 402c. Other body parts may be detected in order to locate the occupants 402a-402c (e.g., chest, torso, arms, etc.). However, for a conference call embodiment, since the processors 106a-106n may be configured to detect the mouth movements of the occupants 402a-402c to determine a sound source, the location of the heads 410a-410c may be a suitable proxy for the location of the occupants 402a-402c.

In some embodiments, the processors 106a-106n may determine the location of the occupants 402a-402c within the cabin of the vehicle 50 by comparing the detected faces 410a-410c with the location references 408a-408n. For example, the processors 106a-106n may be configured to store prior knowledge of the interior of the vehicle 50 in the database 174 (e.g., location coordinates of the window 408a with respect to the capture device 102i that captured the video frame 400, location coordinates of the door 408b with respect to the capture device 102i that captured the video frame 400, etc.). Based on the location of the detected faces 410a-410c with respect to the previously known location of the location references 408a-408n, the processors 106a-106n may determine the location of each of the occupants 402a-402n within the vehicle 50.

In an example, the processors 106a-106n may be configured to detect the seats 404a-404b and/or the bench seat 252a and/or other objects of the interior of the vehicle 50. The processors 106a-106n may be configured to associate a location of the occupants 402a-402c with the seats 404a-404b and/or the bench seat 252a. The location of the occupants 402a-402c may be cross-referenced with the directional tuning capabilities of a microphone (e.g., one of the sensors 114). In an example, the processors 106a-106n may detect the presence of the occupant 402b and that the location of the occupant 402b is in the front passenger seat 404b. In one example, the front passenger seat 404b may be one of the reference locations 408a-408n. In another example, the location of the passenger seat 404b may be associated with the reference location 408b (e.g., the passenger side door due to the proximity with the seat 404b).

In some embodiments, the processors 106a-106n may be configured to determine a distance of the occupants 402a-402n by performing video-based measurements on the detected faces 410a-410n. In one example, 3D co-ordinates of the detected faces 410a-410c may be determined (e.g., by determining a horizontal co-ordinate, a vertical co-ordinate and/or a depth co-ordinate for each occupant 402a-402n with respect to the lens 112a of the capture device 102a). In another example, the sensor fusion module 152 may be configured to analyze input from the vehicle sensors 114 to perform sensor fusion operations (e.g., cross-reference a location determined based on the computer vision operations with weight sensors located in the seats 404a-404b and/or the bench 252a, perform a comparison based on LIDAR, perform a comparison based on radar detection, etc.). In yet another example, the locations of various objects may be determined based on 3D positioning using a stereo pair of cameras (e.g., the video frame 400 may be one of a stereo pair of video frames captured by two of the capture devices 102a-102n implemented as a stereo pair).

Locations may be further determined based on a monocular view (e.g., a monocular view may not provide an accurate result, but a high accuracy for location might not be necessary to tune the directional capabilities of the microphone, which may be relatively large areas of space). Based on the location of the occupants 402a-402c determined by analyzing the location of the faces 410a-410c, the processors 106a-106n may perform a cross-reference with the directional tuning capabilities of a microphone (e.g., one of the sensors 114) in order to calibrate the microphone towards the location of the occupants 402a-402n that are determined to be speaking.

In some embodiments, the analysis performed by the processors 106a-106n may be multi-functional. In the example shown, the processors 106a-106n may detect the faces 410a-410c in order to determine a location of the occupants 402a-402n for tuning the microphone. In some embodiments, the processors 106a-106n may further use the results of detecting the faces 410a-410n in order to detect facial features (e.g., perform facial recognition) and/or determine an age of the occupants 402a-402c. In some embodiments, the processors 106a-106n may be configured to detect other characteristics of the detected faces 410a-410c and/or other body parts of the occupants 402a-402c (e.g., a body size, body proportions, a body orientation, etc.). For example, the location of the occupants 402a-402c may be used to strategically deploy air bags, provide notifications/warnings, adjust door locks, etc. The use of the results of the computer vision operations performed by the processors 106a-106n may be varied according to the design criteria of a particular implementation.

The processors 106a-106n may analyze the detected mouths 412a-412c for movement. The processors 106a-106n may be configured to determine which of the occupants 402a-402c are speaking in response to the movement of the mouths 412a-412c. In an example, if the mouth 412a is determined to not be moving, then the processors 106a-106n may determine that the occupant 402a is not speaking. In another example, if the mouth 412b is determined to be moving, then the processors 106a-106n may determine that the occupant 402b may be speaking. In yet another example, if the mouth 412b and the mouth 412c are both determined to be moving, then the processors 106a-106n may determine either one, both or neither of the occupants 402b-402c is speaking.

The processors 106a-106n may be configured to determine how the mouths 412a-412c are moving. The processors 106a-106n may analyze the shape of the mouths 412a-412c, the sequence of movement of the mouths 412a-412c, how wide the mouths 412a-412c are opened, etc. The processors 106a-106n may be configured to compare the detected shape of the mouths 412a-412n with prior knowledge about speech patterns. The database 174 may store data corresponding with speech patterns (e.g., the shapes of mouth used to pronounce letters, the sequence of mouth movements for speaking particular words, how wide the mouth is opened for the loudness of the audio received, non-speech movements such as chewing, etc.). The processors 106a-106n may be configured to compare the detected shape of the mouths 412a-412c with the stored data about speech patterns to determine whether the occupants 402a-402c are speaking. The shape of the mouths 412a-412c may be further compared to audio captured (e.g., to be described in more detail in association with FIG. 7).

The processors 106a-106n may be configured to provide a confidence level indicating how likely that the occupants 402a-402n are speaking. Each of the occupants 402a-402n may have an associated confidence level. The confidence level may be determined based on the detected movement of the mouths 412a-412c, the shape of the mouths 412a-412c and/or how the movement of the mouths 412a-412c corresponds to the audio captured. Based on the confidence levels determined, the processors 106a-106n may determine which of the occupants 402a-402n are speaking.

The processors 106a-106n may generate the signal VCTRL in response to one or more of the occupants speaking. The signal VCTRL may be provided to a microphone. The signal VCTRL may be configured to tune the microphone in order to capture the audio provided by the occupants 402a-402n that have been determined to be speaking. For example, the microphone may be tuned towards the occupant that is speaking to enhance clarity and/or volume of the audio captured.

The confidence level may be compared to a pre-determined threshold. The threshold may represent a value of the confidence level that may be determined before generating the signal VCTRL. In an example, the processors 106a-106n may provide the confidence level as a percentage (e.g., 100% confidence, 50% confidence, 25% confidence, etc.). The threshold confidence level may be adjustable and/or selectable by a user. In an example, the processors 106a-106n may determine that the occupant 402b is speaking with 75% confidence and if the confidence threshold is 60%, then the processors 106a-106n may generate the signal VCTRL to tune the microphone to capture audio at the location of the occupant 402b. In another example, the processors 106a-106n may determine that the occupants 106a-106n are not speaking with 100% confidence and the threshold for not speaking may be 90% and the processors 106a-106n may generate the signal VCTRL to temporarily disable capture from the microphone (e.g., to prevent capturing unwanted noise while nobody is speaking). In yet another example, the processors 106a-106n may determine that the occupant 402c is speaking with 50% confidence and if the confidence threshold is 60%, then the processors 106a-106n may not generate the signal VCTRL. The thresholds used by the processors 106a-106n for generating the signal VCTRL may be varied according to the design criteria of a particular implementation.

The computer vision operations implemented by the processors 106a-106n may be further configured to perform facial recognition. The features of the detected faces 410a-410n may be extracted and stored in the database 174. The stored features of the detected faces 410a-410n may be used to recognize the occupants 402a-402n in video frames captured in the future. The processors 106a-106n may store audio characteristics of the recognized occupants along with the feature of the detected faces 410a-410n. The stored audio characteristics may be used for calibrating a microphone when the recognized occupant is detected. The microphone may be calibrated specifically for the recognized occupant based on the audio characteristics stored.

Figure 7:
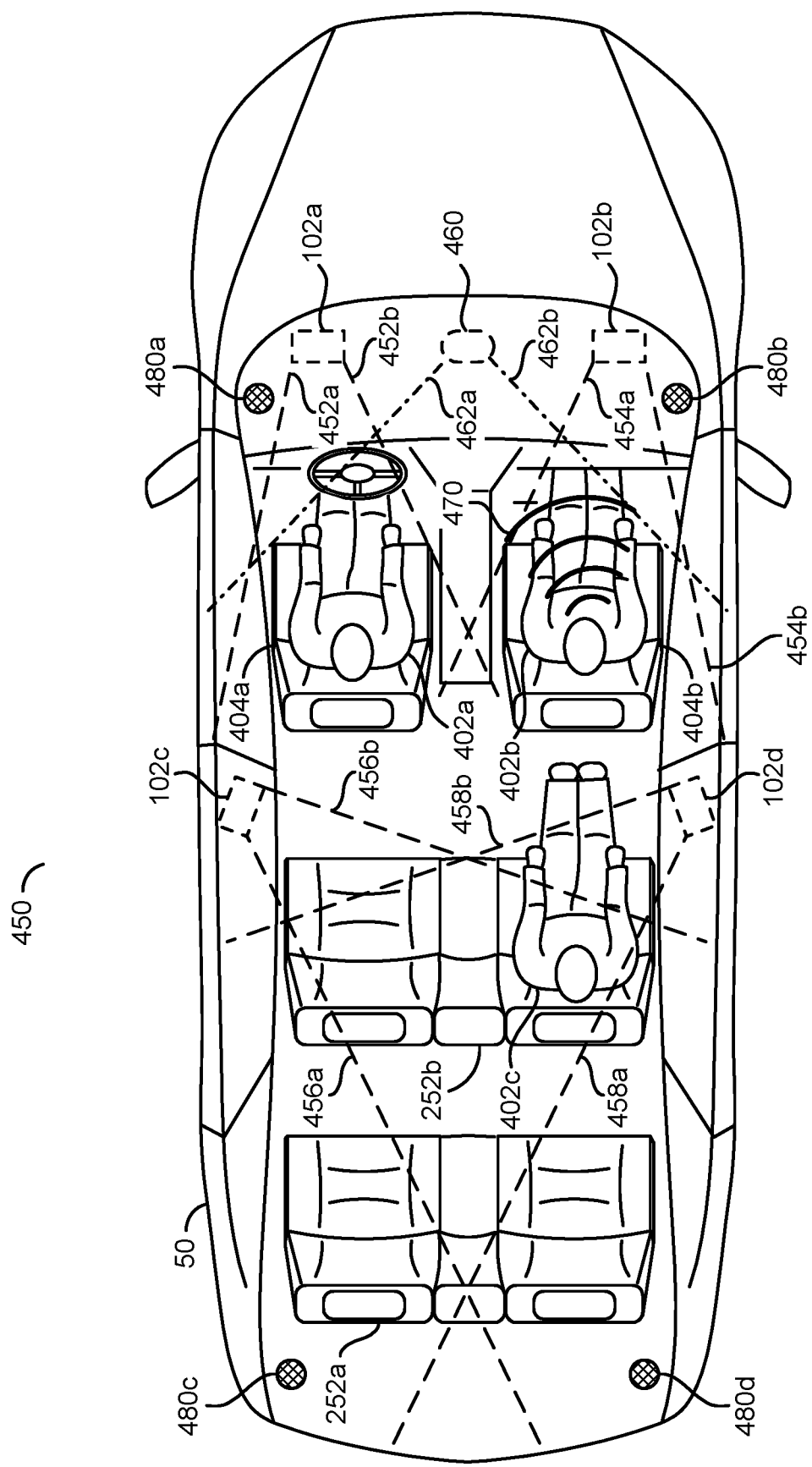
FIG. 7 is a diagram illustrating capture devices capturing video data and a microphone capturing a sound field in a vehicle cabin.

Referring to FIG. 7, a diagram illustrating capture devices capturing video data and a microphone capturing a sound field in a vehicle cabin is shown. A top-down view 450 showing the vehicle 50 is shown. The top-down view 450 may provide a cutaway view of the vehicle 50 to show the interior of the vehicle 50.

The occupants 402a-402c are shown within the vehicle 50. The seats 404a-404b are shown within the vehicle 50. Bench seats 252a-252b are shown within the vehicle 50. The occupant 402a may be located on the driver seat 404a. The occupant 402b may be located on the passenger seat 404b. The occupant 402c may be located on the bench seat 252b. The occupant 402c may be located behind the occupant 402b.

A number of the capture devices 102a-102n are shown within the vehicle 50. In the top-down view 450, four capture devices 102a-102d are shown within the vehicle 50. The capture devices 102a-102d may be located at various locations within the vehicle 50 to capture various fields of view. The capture device 102a is shown having a field of view represented by the lines 452a-452b. The capture device 102b is shown having a field of view represented by the lines 454a-454b. The capture device 102c is shown having a field of view represented by the lines 456a-456b. The capture device 102d is shown having a field of view represented by the lines 458a-458b.

In the example shown in association with FIG. 6, the video frame 400 may be a view captured by one of the capture devices 102a-102n. In some embodiments, the processors 106a-106n may determine which of the occupants 402a-402n are speaking in response to performing computer vision operations on a sequence of video frames captured from one capture device 102a-102n showing each of the occupants 402a-402n. In some embodiments, the processors 106a-106n may determine which of the occupants 402a-402n are speaking in response to performing computer vision operations on multiple sequences of video frames captured by multiple of the capture devices 102a-102n. For example, depending on the arrangement of the interior of the vehicle 50 one capture device may not be able to all the occupants 402a-402n.

The processors 106a-106n may be configured to determine the location of the occupants 402a-402n and/or the movement of the mouths 412a-412n by analyzing video frames captured by multiple of the cameras 102a-102n in parallel. In the example shown, the field of view 452a-452b of the capture device 102a may be directed to capture the driver occupant 402a, the field of view 454a-454b of the capture device 102b may be directed to capture the passenger occupant 402b, the field of view 456a-456b of the capture device 102c may capture one perspective of the benches 252a-252b and the field of view 458a-458b of the capture device 102d may capture an alternate perspective of the benches 252a-252b (e.g., both the capture devices 102c-102d may capture the occupant 402c).

Each of the video frames FRAMES_A-FRAMES_N captured by each of the capture devices 102a-102d may be time-stamped. The time-stamp may enable the processors 106a-106n to compare the results of analyzing the video frames captured at a particular time for each of the capture devices 102a-102d. By comparing the results of analyzing the video frames captured at a particular time, the processors 106a-106n may determine which of the occupants 402a-402c are currently speaking.

The processors 106a-106n may be configured to determine the distance of the particular occupants 402a-402n detected in the video frames captured by each of the capture devices 102a-102n implemented within the vehicle 50. The processors 106a-106n may store pre-defined information about where each of the capture devices 102a-102n are located in the vehicle 50 with respect to the location references 408a-408n. A combination of the locations of the occupants 402a-402n determined with respect to each of the capture devices 102a-102n may be used by the processors 106a-106n to determine a location map of the entire interior of the vehicle 50. The computer vision operations performed on the video frames FRAMES_A-FRAMES_N captured by each of the capture devices 102a-102n may be used to determine the locations of the occupants 402a-402n and/or detect the movement of the mouths 412a-412n.

In the example shown, based on the results of the computer vision operations performed on the video frames FRAMES_A-FRAMES_N captured by the capture device 102a, the processors 106a-106n may determine that the passenger 402a is not speaking but may not be able to make a determination of the other passengers 402b-402c not within the field of view 452a-452b. In the example shown, based on the results of the computer vision operations performed on the video frames FRAMES_A-FRAMES_N captured by the capture device 102b, the processors 106a-106n may determine that the passenger 402b is speaking but may not be able to make a determination of the other passengers 402a and 402c not within the field of view 454a-454b. In the example shown, based on the results of the computer vision operations performed on the video frames FRAMES_A-FRAMES_N captured by the capture device 102c, the processors 106a-106n may determine that the passenger 402c is not speaking but may not be able to make a determination of the other passengers 402a-402b not within the field of view 456a-456b. In the example shown, based on the results of the computer vision operations performed on the video frames FRAMES_A-FRAMES_N captured by the capture device 102d, the processors 106a-106n may determine that the passenger 402c is not speaking but may not be able to make a determination of the other passengers 402a-402b not within the field of view 458a-458b.

By analyzing each of the video frames captured by one of the capture devices 102a-102d, the processors 106a-106n may not be able to determine which of the occupants 402a-402n are speaking. By analyzing all of the video frames captured by each of the capture devices 102a-102d together, the processors 106a-106n may determine which of the occupants 402a-402n are speaking.

A microphone 460 is shown. The microphone 460 may be one of the sensors 114 shown in association with FIG. 1. In an example, the microphone 460 may be implemented as an omnidirectional microphone. The microphone 460 may be configured to capture audio within the vehicle 50. The microphone 460 may be configured to capture the audio spoken by the occupants 402a-402n. The microphone 460 may also capture background audio (e.g., noise) that may interfere with the clarity of the speech of the occupants 402a-402n. The microphone 460 may be configured to provide the audio input signal SEN to the interface 104. In an example implementation, the microphone 460 may be configured to receive audio to communicate to another location for a conference call.

The microphone 460 is shown located near a front end of the vehicle 50. For example, the microphone 460 may be located on a front dashboard of the vehicle 50. In some embodiments, the microphone 460 may be located centrally in the cabin of the vehicle 50. The location of the microphone 460 in the cabin of the vehicle 50 may be varied according to the design criteria of a particular implementation.

Lines 462a-462b are shown extending from the microphone 460. The lines 462a-462b may represent a polar pattern of the microphone 460. In an example, the polar pattern 462a-462b may represent an area in 3D space where the microphone 460 is sensitive to sound input. In the example shown, the polar pattern 462a-426b is shown as two straight lines extending at an angle from the microphone 460. However, the polar pattern 462a-462b may have a curved shaped such as an omnidirectional shape (e.g., a circle extending in all directions from the microphone 460), a cardioid shape (e.g., a circular shape mostly extending in one direction from the microphone 460) and/or a figure eight shape (e.g., two circular shapes located on each side of the microphone 460). The shape of the polar pattern 462a-462b may be varied according to the design criteria of a particular implementation.

In some embodiments, the shape of the polar pattern 462a-462b of the microphone 460 may be selected in response to the signal VCTRL generated by the processors 106a-106n. The microphone 460 may be implemented as a combination of the sensors 114 and the actuators 116 shown in association with FIG. 1. In an example, the portion of the microphone 460 that implements one of the sensors 114 may receive the input audio and a portion of the microphone 460 that receives the signal VCTRL and adjusts the polar pattern 462a-462b may implement one of the actuators 116.

Curved lines 470 are shown. The curved lines 470 may represent audio waves and/or a sound field. In the example shown, the sound field 470 may be generated by the occupant 402b. For example, the sound field 470 may be generated by the passenger 402b speaking.

The microphone 460 may be configured to receive the sound field 470. The microphone 460 may convert the analog sound field 470 into digital and/or computer readable data (e.g., the signal SEN). The computer readable audio data may be analyzed by the processors 106a-106n. In some embodiments, the data from the sound field 470 may be analyzed by another component (e.g., a component external to the apparatus 100) and the results of the analysis may be presented to the processors 106a-106n.

Based on the analysis of the sound field 470, the processors 106a-106n may be configured to determine audio characteristics of the sound field 470. The audio characteristics may comprise directional information. The audio characteristics may comprise frequency information. The audio characteristics may comprise recognition of the sounds in the sound field 470. In an example, the recognition of the sounds may comprise the words and/or letters (e.g., the phonemes) of the sound field 470. For example, if the passenger 402b makes an "o" sound the processors 106a-106n may determine that the sound field 470 captured comprises the "o" sound. In response to the analysis of the sound field 470 captured by the microphone 460, the processors 106a-106n may determine the direction that the sound field 470 originated from, which directions that are not the source of the sound field 470, volume level and/or frequency levels of the sound field 470 and/or which words and/or sounds are in the sound field 470.

Audio output devices 480a-480d are shown in the ego vehicle 50. The audio output devices 480a-480d may be speakers. The speakers 480a-480d may be located throughout interior of the ego vehicle 50. In the example shown, the speaker 480a may be located near the driver seat 404a, the speaker 480b may be located near the passenger seat 404b and the speakers 480c-480d may be located behind the rear bench 252a. The number, type and/or location of the speakers 480a-480d may be varied according to the design criteria of a particular implementation.

In some embodiments, the audio output devices 480a-480d may be the actuators 116. The audio output devices 480a-480d may be configured to playback audio. The audio output devices 480a-480d may be implemented to enable a conference call in the vehicle 50. In an example, the microphone 460 may be configured to receive and transmit audio spoken by the occupants 402a-402n to talk to another party of the conference call, and the speakers 480a-480d may be configured to output audio from the other party of the conference call. Noise cancellation may be implemented by the apparatus 100 to prevent audio from the speakers 480a-480d from being transmitted in the conference call.

Figure 8:
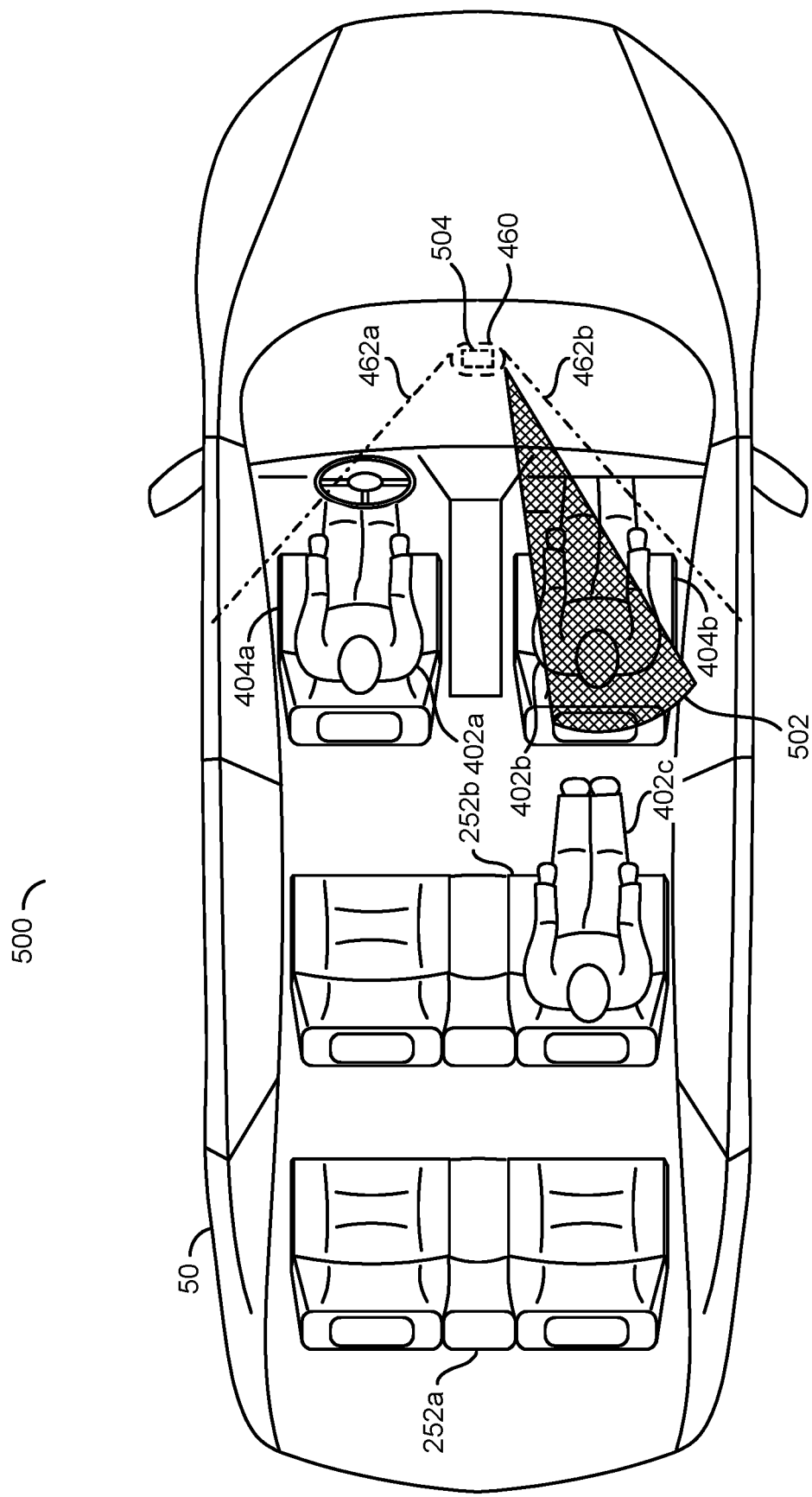
FIG. 8 is a diagram illustrating tuning an omnidirectional microphone in response to detecting an occupant speaking.

Referring to FIG. 8, a diagram illustrating tuning an omnidirectional microphone in response to detecting an occupant speaking is shown. A top-down view 500 showing the vehicle 50 is shown. The top-down view 500 may provide a cutaway view of the vehicle 50 to show the interior of the vehicle 50. The top-down view 500 may be similar to the top-down view 450 shown in association with FIG. 7.

The occupants 402a-402c are shown within the vehicle 50. The seats 404a-404b are shown within the vehicle 50. Bench seats 252a-252b are shown within the vehicle 50. The microphone 460 is shown within the vehicle 50. The polar pattern 462a-462b is shown within the vehicle 50. The capture devices 102a-102n and/or the audio output devices 480a-480d may be implemented within the vehicle 50 but are not shown, for clarity.

A shaded region 502 is shown. The shaded region 502 may be within the polar pattern 462a-462b of the microphone 460. The shaded region 502 may represent a tuned region. The tuned region 502 is shown as a wedge shape. The tuned region 502 may be wider (e.g., a larger proportion of the polar pattern 462a-462b) or narrower (e.g., a smaller proportion of the polar pattern 462a-462b) than the example shown. The side and/or shape of the tuned region 502 may be varied according to the design criteria of a particular implementation.

The tuned region 502 may be a subset of the polar pattern 462a-462b of the microphone 460. The tuned region 502 may be an area of focus for the input sound reception of the microphone 460. The microphone 460 may enhance capture of audio in the direction of the tuned region 502 and/or limit capture of audio outside of the tuned region 502. In an example, microphone 460 may emphasize audio captured within the tuned region 502. In another example, the microphone 460 may block and/or apply noise cancellation on audio received that is outside of the tuned region 502. The audio converted to digital and/or computer readable information from the microphone 460 may have greater clarity in the tuned region 502 compared to the portions of the polar pattern 462a-462b outside of the tuned region 502. The type(s) of enhancements applied to the audio from the tuned region 502 and/or the type(s) of limitations applied to the audio from outside of the tuned region 502 may be varied according to the design criteria of a particular implementation.

The size and/or location of the tuned region 502 may be adjusted in real time. Adjusting the tuned region 502 may adjust an input for the microphone 460. The processors 106a-106n may be configured to generate the signal VCTRL to select, shape and/or direct the tuned region 502 in real time. In the example shown, the tuned region 502 may be directed towards the passenger 402b. The tuned region 502 shown may correspond with the direction of origin of the sound field 470 shown in association with FIG. 7 (e.g., words spoken by the passenger 402b). The processors 106a-106n may be configured to adjust the tuned region 502 in response to the location of the origin of the input audio 470.

A block (or circuit) 504 is shown. The circuit 504 may be a component of the microphone 460. The component 504 may be one of the actuators 116. The component 504 may be configured to adjust the tuned region 502. In an example, the processors 106a-106n may be configured to generate the signal VCTRL and in response to the signal VCTRL, the component 504 may adjust the tuned region 502.

The processors 106a-106n may be configured to locate the origin of the input audio 470 by performing the computer vision operations on the video frames FRAMES_A-FRAMES_N. The processors 106a-106n may detect the location of the passengers 402a-402n by detecting the faces 410a-410n. The processors 106a-106n may be configured to determine which of the occupants 402a-402n are speaking by performing the computer vision operations to detect the mouths 412a-412n and monitor the movement of the mouths 412a-412n. The location of the origin of the input audio 470 may correspond to the occupant (or occupants) 402a-402n that are determined to have the detected mouths 412a-412n moving.

The processors 106a-106n may be configured to cross-reference the location of the origin of the audio determined using the computer vision operations with the analysis of the sound field 470. The sensor fusion module 152 may be configured to determine whether the audio characteristics of the sound field 470 correspond with the movement of the mouths 412a-412n. The comparison of disparate sources of information (e.g., the video analysis results and the sound field analysis results) may provide information that may not be available from either source alone. If the audio characteristics do not match the results of the computer vision operations, then the confidence level of the location of the origin of the input audio 470 may be reduced. If the audio characteristics do match the results of the computer vision operations, then the confidence level of the location of the origin of the input audio 470 may be increased.

In some embodiments, the apparatus 100 may be implemented in order to adjust the tuned region 502 to enable clear audio communication for an in-vehicle conference call. For an in-vehicle conference call, the important characteristics of the audio captured by the microphone 460 may be the clarity of human speech. Since the human speech may be the desirable audio to be captured and other noise may be undesirable, the tuned region 502 may be adjusted by the processors 106a-106n for capturing clear and/or comprehensible human speech.

In one example, if the characteristics of the sound field 470 do not indicate a human is speaking, then the processors 106a-106n may reduce the confidence level for adjusting the tuned region 502. For example, the processors 106a-106n may detect one or more of the mouths 412a-412n are moving, but the mouth movements may correspond to chewing food or yawning and not spoken words. Noise that is not human speech (e.g., audio from outside the vehicle, snoring, coughing, sneezing, music, crinkling wrappers, etc.) may not be desired and the tuned region 502 may be adjusted to avoid enhancing audio of the undesired sounds.

In one example, the results of the computer vision operations may improve the detection of the location of the origin of the input audio 470. Two passengers may be seated close to each other (e.g., the passenger 402c may be located in generally the same direction, but may be behind the passenger 402*b*). The sound field analysis by the processors 106*a*-106*n* may detect a general direction of the audio source but may not distinguish the distance from the microphone 460. The comparison of the sound field analysis with the computer vision operations may detect a match between the words spoken in the input audio 470 and the movement of the detected mouths 412*a*-412*n*. For example, detecting that the movement of the mouths 412*a*-412*n* is synchronized with and/or corresponds to the words detected in the sound field analysis may be used to increase the confidence level about which of the occupants 402*a*-402*n* is speaking. In the example video frame 400 shown in association with FIG. 6, the passenger 402*b* and the passenger 402*c* may be in generally the same direction, but the analysis of the mouth movement may determine that the passenger 402*c* is speaking instead of the passenger 402*b*.

In another example, the frequency characteristics of the input audio 470 may be compared to the characteristics of the occupants 402*a*-402*n* detected using the computer vision operations. The frequency characteristics of the input audio 470 may be analyzed to determine an age and/or gender of the source of the spoken words. In an example, younger children may have more higher frequencies when speaking compared to adults. If higher frequencies are detected by the sound field analysis but the results of the computer vision operations for detecting age only detects adults then the confidence level about which of the occupants 402*a*-402*n* is speaking may be reduced.

Similarly, facial recognition may be implemented. The database 174 may store audio characteristics for known occupants (e.g., regular users of the vehicle 50). When the computer vision operations performed by the processors 106*a*-106*n* recognize a face, the audio characteristics of the recognized user may be retrieved from the database 174. The sound field analysis may be compared with the stored audio characteristics to determine whether the recognized user is speaking. The sound field analysis of the previously stored audio characteristics and/or the facial recognition may be used by the processors 106*a*-106*n* to adjust the confidence level for determining which of the occupants 402*a*-402*n* is speaking.

In yet another example, the frequency characteristics of the input audio 470 may be compared to the movement of the mouths 412*a*-412*n* using the computer to remove noise canceling when one of the occupants 402*a*-402*n* starts speaking. The processors 106*a*-106*n* may provide instructions to the microphone 460 to perform noise cancellation on regions outside of the tuned region 502. The noise cancellation may limit the audio received outside of the tuned region 502, which may prevent sound field analysis on incoming audio. For example, if the occupant 402*a* is outside of the tuned region 502 and then starts speaking, the audio capture may be attenuated. The computer vision operations may detect that the mouth 412*a* is moving and generate the signal VCTRL to disable the noise cancellation to enable audio capture for sound field analysis.

The processors 106*a*-106*n* may be configured to compare a confidence level for which of the occupants 402*a*-402*n* is speaking with a confidence level threshold. If the confidence level for which occupant is speaking is above the confidence level threshold, then the processors 106*a*-106*n* may generate the signal VCTRL. The signal VCTRL may be configured to cause the component 504 to adjust the orientation of the tuned region 502. The processors 106*a*-106*n* may be configured to provide the signal VCTRL to provide information in order to adjust the tuned region 502 for the location of the occupant 402*a*-402*n* that has been determined to be speaking.

Figure 9:
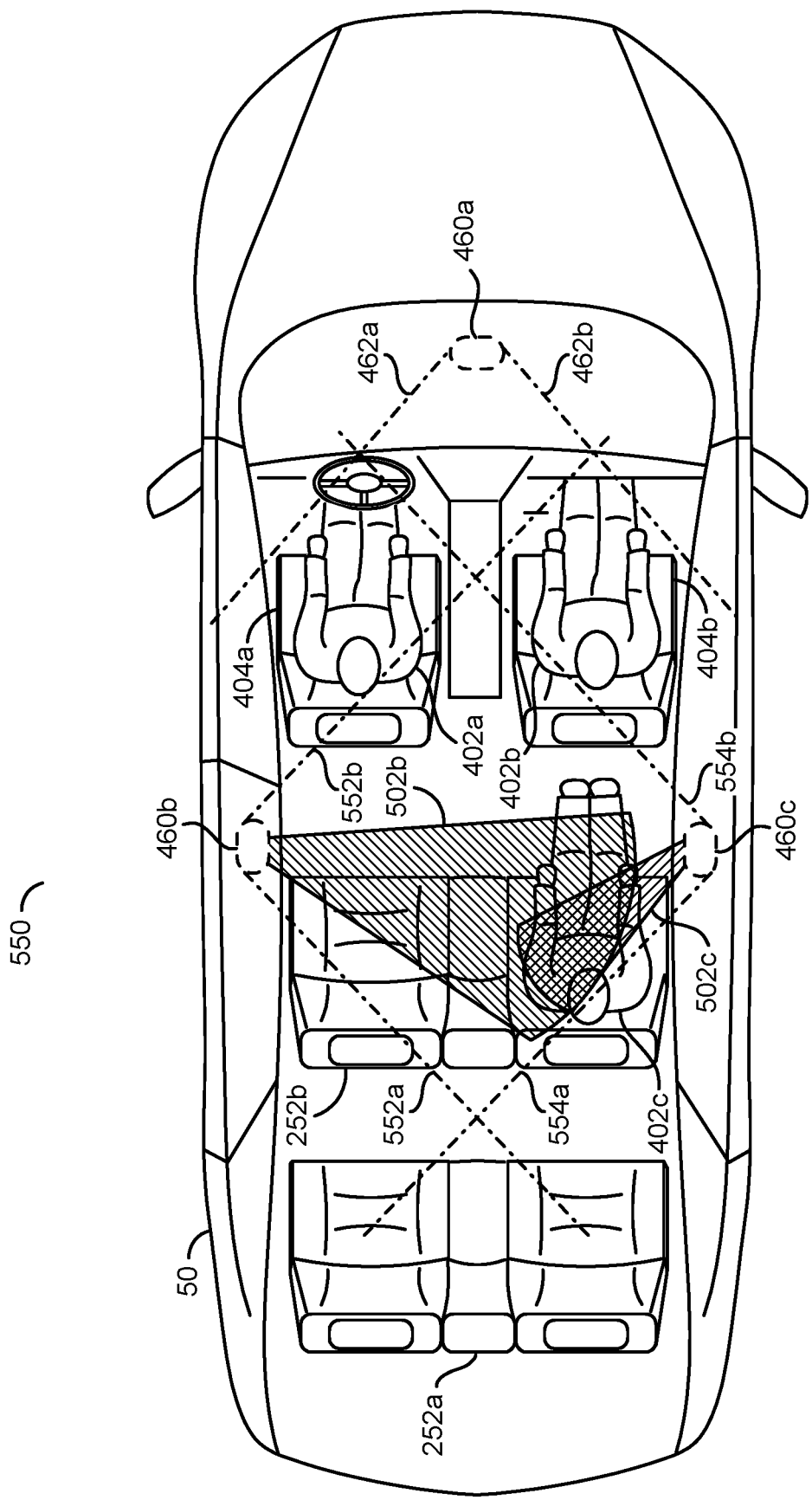
FIG. 9 is a diagram illustrating tuning multiple microphones in response to detecting an occupant speaking.

Referring to FIG. 9, a diagram illustrating tuning multiple microphones in response to detecting an occupant speaking is shown. A top-down view 550 showing the vehicle 50 is shown. The top-down view 550 may provide a cutaway view of the vehicle 50 to show the interior of the vehicle 50. The top-down view 550 may be similar to the top-down view 450 shown in association with FIG. 7.

The occupants 402*a*-402*c* are shown within the vehicle 50. The seats 404*a*-404*b* are shown within the vehicle 50. Bench seats 252*a*-252*b* are shown within the vehicle 50. The capture devices 102*a*-102*n* and/or the audio output devices 480*a*-480*d* may be implemented within the vehicle 50 but are not shown, for clarity.

Multiple microphones 460*a*-460*c* are shown within the vehicle 50. The microphone 460*a* is shown having the polar pattern 462*a*-462*b* similar to the microphone 460 shown in association with FIG. 8. The microphone 460*b* is shown on a driver side of the vehicle 50. Dotted lines 552*a*-552*b* are shown representing the polar pattern of the microphone 460*b*. The microphone 460*c* is shown on a passenger side of the vehicle 50. Dotted lines 554*a*-554*b* are shown representing the polar pattern of the microphone 460*c*.

Three microphones 460*a*-460*c* may be implemented in the example shown. In some embodiments, additional microphones (e.g., 460*a*-460*n*) may be implemented throughout the vehicle 50. The microphones 460*a*-460*n* may be arranged and/or oriented to capture audio from each of the potential occupants of the vehicle 50 (e.g., directed towards the seats 404*a*-404*n* and/or the benches 252*a*-252*n*). The number, type and/or arrangement of the microphones 460*a*-460*n* may be varied according to the design criteria of a particular implementation.

Tuned regions 502*b*-502*c* are shown. The tuned regions 502*b*-502*c* may each have a similar implementation as the tuned region 502 shown in association with FIG. 8. The tuned region 502*b* may correspond to the microphone 460*b*. The tuned region 502*c* may correspond to the microphone 460*c*. The tuned regions 502*b*-502*c* may be directed towards the passenger 402*c*. The microphone 460*a* may similarly implement a tuned region 502*a*. The turned region 502*a* is not shown. Since the passenger 402*c* is outside of the range of the polar pattern 462*a*-462*b* of the microphone 460*a*, the processors 106*a*-106*n* may not assign the tuned region 502*a* while the passenger 402*c* is speaking.

The processors 106*a*-106*n* may be configured to adjust turned regions 502*a*-502*n* for each of the microphones 460*a*-460*n* implemented. Each of the tuned regions 502*a*-502*n* may be adjusted independently. The processors 106*a*-106*n* may be configured to provide the signal VCTRL to one or more of the microphones 460*a*-460*n* in order to adjust the tuned regions 502*a*-502*n* to work in unison to capture audio of the one or more of the passengers 402*a*-402*n* that is speaking.

In the example shown, the processors 106*a*-106*n* may have determined that the occupant 402*c* has been speaking based on the movement of the detected mouth 412*c* using the computer vision operations and/or sound field analysis from audio captured by each of the microphones 460*a*-460*c*. The processors 106*a*-106*n* may determine the location of the occupant 402*c* within the vehicle 50 based on the location of the detected face 410*c* (e.g., located on the passenger side of the bench seat 252*b*. The processors 106*a*-106*n* may compare the location of the occupant 402*c* with the polar region 462*a*-462*b* of the microphone 460*a*, the polar region 552*a*-

552*b* of the microphone 460*b* and the polar region 554*a*-554*b* of the microphone 460*c* (and any other microphones implemented within the vehicle 50). The processors 106*a*-106*n* may determine that the occupant 402*c* is outside of the range of the polar region 462*a*-462*b* of the microphone 460*a*. In one example, the processors 106*a*-106*n* may not generate the signal VCTRL for the microphone 460*a*. In another example, the processors 106*a*-106*n* may generate the signal VCTRL to enable noise cancellation for the polar region 462*a*-462*b* of the microphone 460*a*. The processors 106*a*-106*n* may determine that the occupant 402*c* is located at a right side and towards an end of range of the polar region 552*a*-552*b* of the microphone 460*b* and generate the signal VCTRL to adjust the tuned region 502*b* to be angled towards the location of the occupant 402*c*. The processors 106*a*-106*n* may determine that the occupant 402*c* is located at a left side of the polar region 554*a*-554*b* of the microphone 460*c* and near the microphone 460*c* and generate the signal VCTRL to adjust the tuned region 502*c* to be angled towards the location of the occupant 402*c*.

The tuned regions 502*b*-502*c* are shown partially overlapping. Both the microphone 460*b* and the microphone 460*c* may captured the audio spoken by the occupant 402*c*. Capturing audio from two or more of the microphones 460*a*-460*c* may enable spatial characteristics of the audio to be captured (e.g., to provide stereo sound, surround sound, three-dimensional sound, ambisonics, object-oriented audio, etc.). The processors 106*a*-106*n* may be further configured to perform sound field analysis on audio captured by each of the microphones 460*a*-460*c*. Sound field analysis on audio captured from multiple locations may provide additional data to enable the processors 106*a*-106*n* to location (e.g., triangulate) the origin of the spoken audio.

In the example shown, the microphones 460*a*-460*c* may be stationary within the ego vehicle 50 (e.g., installed as a component in the vehicle 50). In some embodiments, the microphones 460*a*-460*c* may be moveable. For example, the microphones 460*a*-460*c* may be after-market products that may be plugged into the apparatus 100. The computer vision operations performed by the processors 106*a*-106*n* may be configured to detect the location(s) of the microphones 460*a*-460*c* and adjust the tuned regions 502*a*-502*c* based on the current location of the microphones 460*a*-460*c* and the angle from the microphones 460*a*-460*c* that the audio source is coming from. For example, the sound field analysis may further be used to detect the location of the microphones 460*a*-460*c*.

Figure 10:
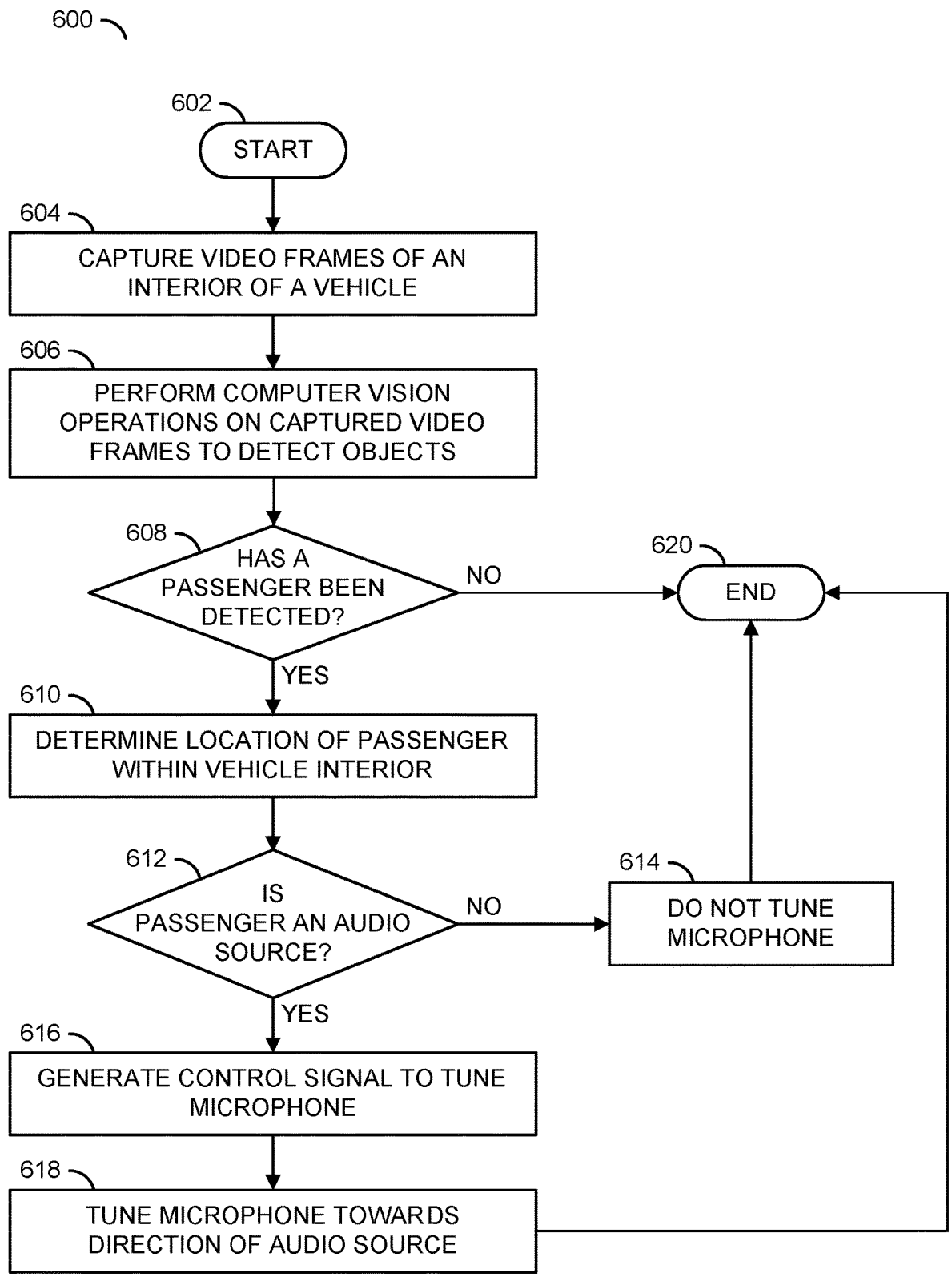
FIG. 10 is a flow diagram illustrating a method for optimizing audio capture in a vehicle.

Referring to FIG. 10, a method (or process) 600 is shown. The method 600 may optimize audio capture in a vehicle. The method 600 generally comprises a step (or state) 602, a step (or state) 604, a step (or state) 606, a decision step (or state) 608, a step (or state) 610, a decision step (or state) 612, a step (or state) 614, a step (or state) 616, a step (or state) 618, and a step (or state) 620.

The step 602 may start the method 600. Next, in the step 604, the capture devices 102*a*-102*n* may capture video frames of an interior of the ego vehicle 50. In an example, the capture devices 102*a*-102*n* may generate the video frames FRAMES_A-FRAMES_N and present the video frames FRAMES_A-FRAMES_N to the processors 106*a*-106*n*. In the step 606, the CNN module 150 may perform the computer vision operations on the captured video frames FRAMES_A-FRAMES_N to detect various objects. Next, the method 600 may move to the decision step 608.

In the decision step 608, the decision module 158 may determine whether one or more of the passengers 402*a*-402*n* has been detected. For example, the CNN module 150 may compare descriptors and/or features corresponding with the known descriptors and/or features of a vehicle passenger. If no passengers have been detected, the method 600 may move to the step 620. If at least one of the passengers 402*a*-402*n* has been detected, then the method 600 may move to the step 610. In the step 610, the processors 106*a*-106*n* may determine the location(s) of the detected passengers 402*a*-402*n* within the interior of the ego vehicle 50. Next, the method 600 may move to the decision step 612.

In the decision step 612, the processors 106*a*-106*n* may determine whether the detected passenger is an audio source. In an example, the CNN module 150 may perform the computer vision operations to analyze the detected mouths 412*a*-412*n* for movement. The sensor fusion module 152 may be configured to compare the movement of the detected mouths to the sound field analysis to determine if the occupant is speaking (e.g., is the audio source). If the passenger is not an audio source, then the method 600 may move to the step 614. In the step 614, the processors 106*a*-106*n* may not tune the microphone 460. For example, the processors 106*a*-106*n* may perform noise cancellation and/or not adjust the location and/or orientation of the tuned region 502. Next, the method 600 may move to the step 620.

In the decision step 612, if the passenger is an audio source, then the method 600 may move to the step 616. In the step 616, the processors 106*a*-106*n* may generate the control signal VCTRL to tune the microphone 460. Next, in the step 618, the component 504 may read the signal VCTRL to determine how to tune the microphone 460 and adjust the tuned region 502 towards the direction of the audio source. Next, the method 600 may move to the step 620. The step 620 may end the method 600.

Figure 11:
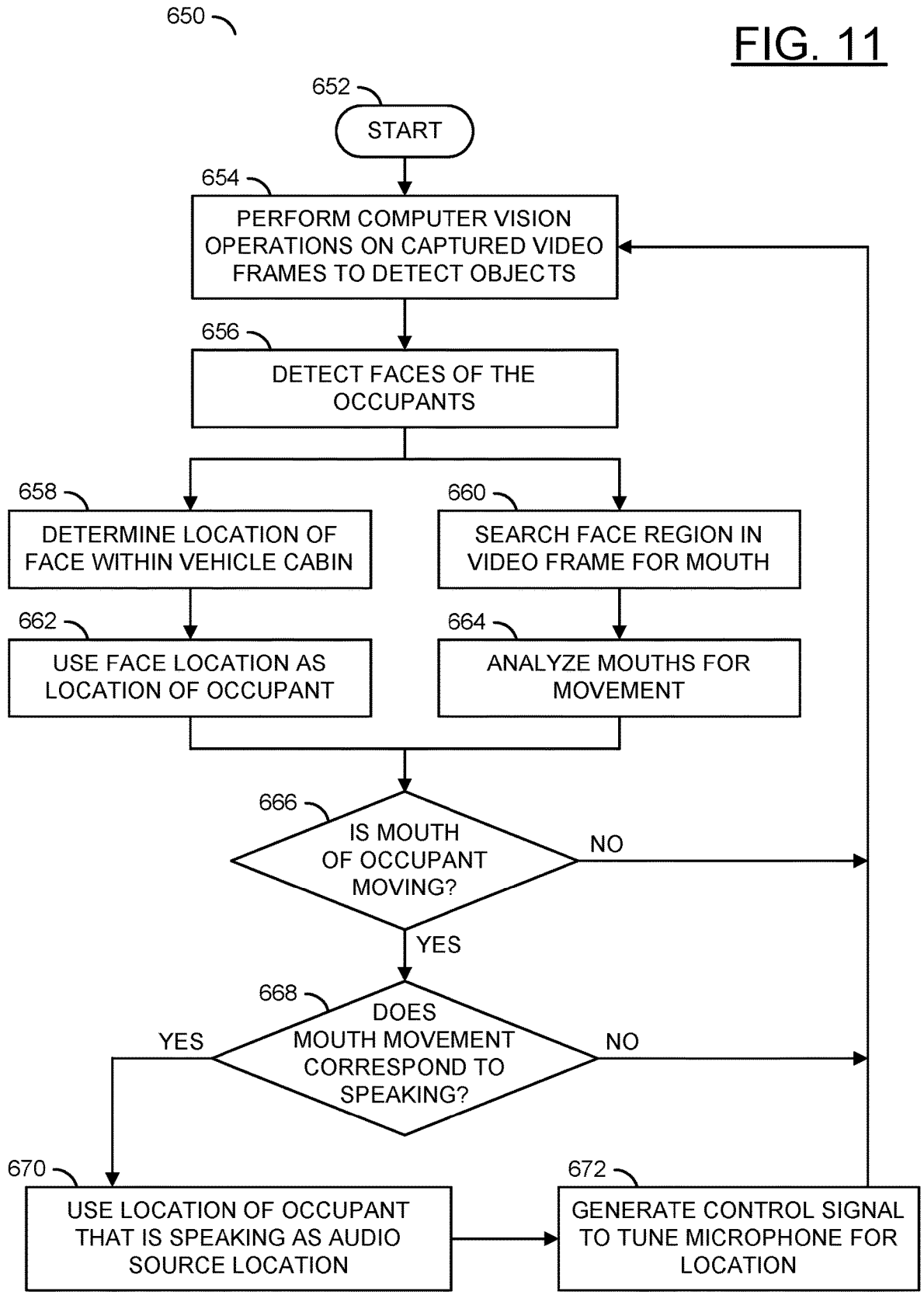
FIG. 11 is a flow diagram illustrating a method for determining which occupant in a vehicle is speaking.

Referring to FIG. 11, a method (or process) 650 is shown. The method 650 may determine which occupant in a vehicle is speaking. The method 650 generally comprises a step (or state) 652, a step (or state) 654, a step (or state) 656, a step (or state) 658, a step (or state) 660, a step (or state) 662, a step (or state) 664, a decision step (or state) 666, a decision step (or state) 668, a step (or state) 670, and a step (or state) 672.

The step 652 may start the method 650. In the step 664, the processors 106*a*-106*n* may perform the computer vision operations on the video frames FRAMES_A-FRAMES_N captured by the capture devices 102*a*-102*n* in order to detect various objects. Next, in the step 656, the CNN module 150 may detect one or more faces 410*a*-410*n* of the occupants 402*a*-402*n*. Next, the method 650 may move to the step 658 and the step 660.

In the step 658, the processors 106*a*-106*n* may determine a location of the detected faces 410*a*-410*n* in the interior of the ego vehicle 50. Next, the method 650 may move to the step 662. In the step 660, the processors 106*a*-106*n* may search the portion of the video frames FRAMES_A-FRAMES_N that correspond to the detected faces 410*a*-410*n* to detect the mouths 412*a*-412*n* that correspond to the occupants 402*a*-402*n*. Next, the method 650 may move to the step 664. In the step 662, the processors 106*a*-106*n* may use the location of the detected faces 410*a*-410*n* within the vehicle 50 as the location of the occupants 402*a*-402*n*. In the step 664, the processors 106*a*-106*n* may analyze the movement of the detected mouths 412*a*-412*n*. The steps 658 and 662 may generally be performed in parallel with the steps 660 and 664. From the step 662 and/or the step 664, the method 650 may move to the decision step 666.

In the decision step 666, the decision module 158 may determine whether the detected mouths 412*a*-412*n* of the occupants 402*a*-402*n* are moving. If the detected mouths 412a-412n are not moving, then the method 650 may return to the step 654. If the detected mouths 412a-412n are determined to be moving, then the method 650 may move to the decision step 668.

In the decision step 668, the decision module 158 may determine whether the movement of the detected mouths 412a-412n corresponds to speaking. For example, the decision module 158 may analyze the results and/or confidence level of the computer vision operations to determine whether the movement of the detected mouths 412a-412n correspond to talking or are non-speech related movements. If the mouth movements do not correspond to speaking, then the method 650 may return to the step 654. If the mouth movements do correspond to speaking, then the method 650 may move to the step 670.

In the step 670, the processors 106a-106n may use the location of the occupant (e.g., determined in the step 662) that is speaking as the location of the audio source. Next, in the step 672, the processors 106a-106n may generate the signal VCTRL to adjust the location of the tuned region 502. Next, the method 650 may return to the step 654.

Figure 12:
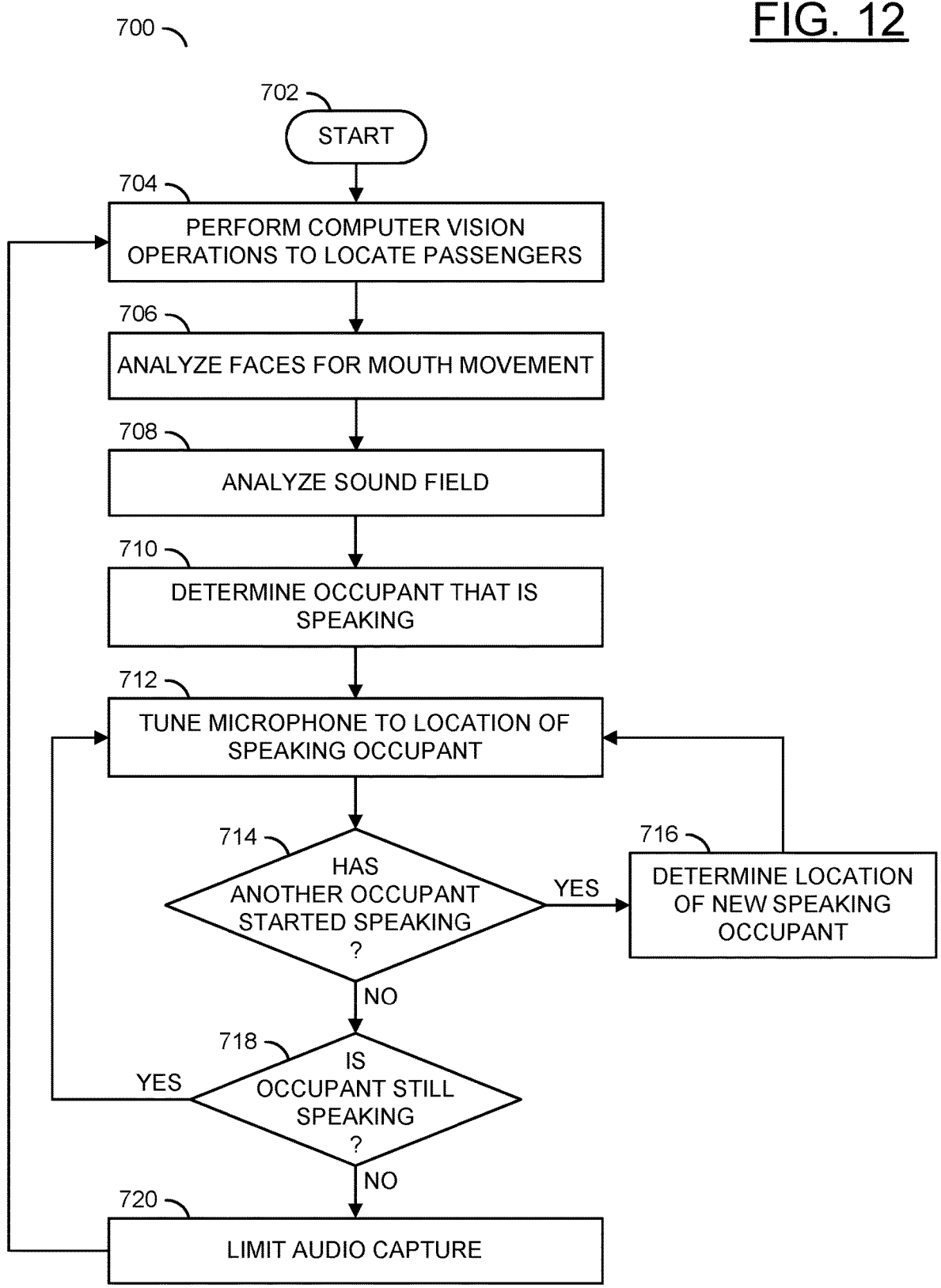
FIG. 12 is a flow diagram illustrating a method for analyzing a sound field to determine which occupant in a vehicle is speaking.

Referring to FIG. 12, a method (or process) 700 is shown. The method 700 may analyze a sound field to determine which occupant in a vehicle is speaking. The method 700 generally comprises a step (or state) 702, a step (or state) 704, a step (or state) 706, a step (or state) 708, a step (or state) 710, a step (or state) 712, a decision step (or state) 714, a step (or state) 716, a decision step (or state) 718, and a step (or state) 720.

The step 702 may start the method 700. In the step 704, the processors 106a-106n may perform the computer vision operations to locate the passengers 402a-402n. Next, in the step 706, the processors 106a-106n may analyze the locations of the detected faces 410a-410n to determine whether there is movement of the detected mouths 412a-412n. Next, in the step 708, the processors 106a-106n may analyze the sound field captured by the microphone 460. In the step 710, the sensor fusion module 152 may compare the results of the computer vision operations to the results of the sound field analysis to determine which of the occupants 402a-402n is speaking. In the step 712, the processors 106a-106n may generate the signal VCTRL to enable the component 504 to adjust the location of the tuned region 502 towards the location of the occupant 402a-402n that is determined to be the audio source. Next, the method 700 may move to the decision step 714.

In the decision step 714, the processors 106a-106n may determine whether another of the occupants 402a-402n has started speaking. For example, the processors 106a-106n may continually monitor the detected mouths 412a-412n and/or analyze the sound field to determine which occupants have started or stopped speaking. If another one of the occupants 402a-402n has started speaking then the method 700 may move to the step 716. In the step 716, the processors 106a-106n may determine the location of the occupant that has started speaking. Next, the method 700 may return to the step 712 to adjust the tuned region 502 for the new speaking occupant. By tracking which of the occupants 402a-402n is speaking (e.g., during a conference call), the processors 106a-106n may direct the input of the microphone 460 (e.g., the tuned region 502) in real time in response to which of the passengers 402a-402n is currently speaking.

In an example, if two of the occupants 402a-402n are determined to be speaking at the same time, the component 504 may be configured to generate the tuned region 502 that may be split to cover multiple locations. In another example, if two of the occupants are speaking but the new occupant speaking is interrupting the original occupant speaking then the processors 106a-106n may not adjust the tuned region 502 until the original occupant speaking has finished talking.

In the decision step 714, if another one of the occupants 402a-402n has not started speaking, then the method 700 may move to the decision step 718. In the decision step 718, the processors 106a-106n may determine whether the occupant is still speaking. For example, the processors 106a-106n may continually monitor the movements of the detected mouth 412a-412n of the occupant that has been determined to be speaking and/or continually analyze the sound field. If the occupant is still speaking, then the method 700 may return to the step 712 (e.g., the tuned region 502 may not be adjusted). If occupant has stopped speaking, then the method 700 may move to the step 720. In the step 720, the processors 106a-106n may generate the signal VCTRL to limit the audio capture by the microphone 460 (e.g., remove the tuned region 502). Limiting the audio capture may reduce the amount of noise transmitted in a conference call when nobody is talking. Next, the method 700 may return to the step 704.

Figure 13:
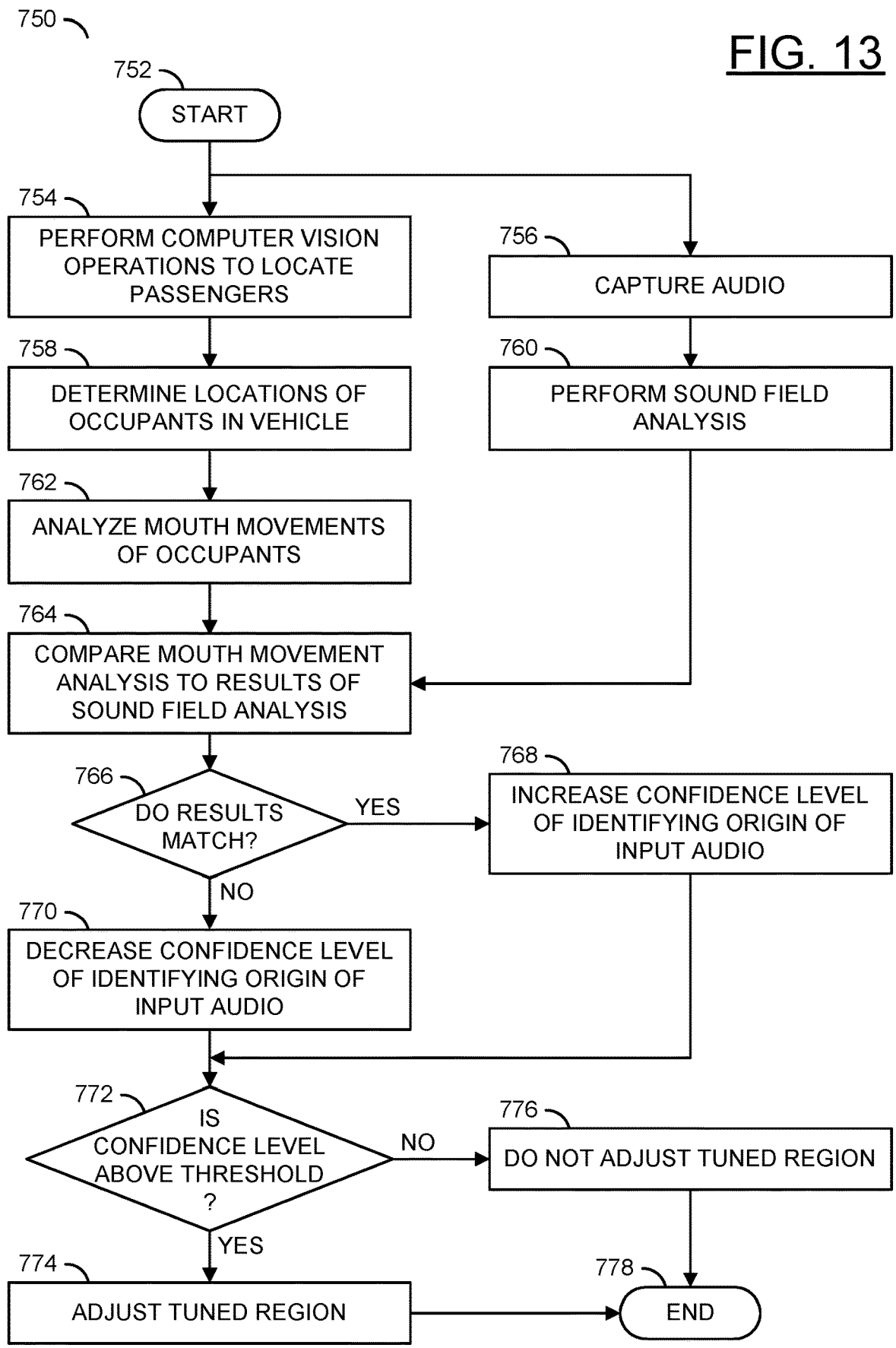
FIG. 13 is a flow diagram illustrating a method for adjusting a confidence level of detecting which occupant is speaking.

Referring to FIG. 13, a method (or process) 750 is shown. The method 750 may adjust a confidence level of detecting which occupant is speaking. The method 750 generally comprises a step (or state) 752, a step (or state) 754, a step (or state) 756, a step (or state) 758, a step (or state) 760, a step (or state) 762, a step (or state) 764, a decision step (or state) 766, a step (or state) 768, a step (or state) 770, a decision step (or state) 772, a step (or state) 774, a step (or state) 776, and a step (or state) 778.

The step 752 may start the method 750. Next, the method 750 may move to the step 754 and the step 756. In the step 754, the processors 106a-106n may perform the computer vision operations to locate the passengers 402a-402n. Next, the method 750 may move to the step 758. In the step 756, the microphone 460 may capture incoming audio. Next, the method 750 may move to the step 760. In the step 758, the processors 106a-106n may determine the locations of the occupants 402a-402n within the vehicle 50. Next, the method 750 may move to the step 762. In the step 760, the processors 106a-106n may perform the sound field analysis on the audio captured by the microphone 460. Next, the method 750 may move to the step 764. In the step 762, the processors 106a-106n may analyze the movement of the detected mouths 412a-412n of the occupants 402a-402n. Next, the method 750 may move to the step 764. Generally, the steps 754-762 may be performed in parallel to enable a comparison of the results of the computer vision operations to the results of the sound field analysis to be performed.

In the step 764, the sensor fusion module 152 may compare the movement of the detected mouths 412a-412n to the results of the sounds field analysis. Next, the method 750 may move to the decision step 766. In the decision step 766, the sensor fusion module 152 may determine whether the results of the sound field analysis and the computer vision operations match. If the results do match, then the method 750 may move to the step 768. In the step 768, the processors 106a-106n may increase a confidence level of identifying the origin of the input audio. Next, the method 750 may move to the decision step 772. In the decision step 766, if the results do not match, then the method 750 may move to the step 770. In the step 770, the processors 106a-106n may decrease the confidence level of identifying the origin of the input audio. Next, the method 750 may move to the decision step 772.

In the decision step 772, the processors 106a-106n may determine whether the confidence level for the origin of the input audio is above a threshold level. If the confidence level is above the threshold level, then the method 750 may move to the step 774. In the step 774, the processors 106a-106n may generate the signal VCTRL to adjust the tuned region 502. Next, the method 750 may move to the step 778. In the decision step 772, if the confidence level is not above the threshold level, then the method 750 may move to the step 776. In the step 776, the processors 106a-106n may not adjust the tuned region 502. Next, the method 750 may move to the step 778. The step 778 may end the method 750.

The functions performed by the diagrams of FIGS. 1-13 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   an interface configured to receive pixel data corresponding to an interior of a vehicle; and
   a processor configured to
   (i) perform computer vision operations on the pixel data arranged as video frames to detect objects in said video frames,
   (ii) detect one or more passengers based on said objects detected in said video frames,
   (iii) determine a location of each of said passengers detected,
   (iv) determine which of said passengers is a first audio source,
   (v) detect a second audio source from said passengers detected,
   (vi) determine when said first audio source has stopped being active; and
   (vii) generate a control signal to adjust an input of a microphone towards (a) said first audio source while said first audio source is active and (b) said second audio source after said first audio source has stopped being active,
   wherein (a) said computer vision operations are used to determine said location and said first audio source, (b) said computer vision operations detect said objects and said locations of said objects within said interior of said vehicle by performing feature extraction based on weight values for each of a plurality of visual features that are associated with said objects extracted from said video frames, (c) said weight values are determined in response to an analysis of training data by said processor prior to said feature extraction, (d) said training data comprises results of said computer vision operations performed on reference images acquired using fleet learning, (e) said fleet learning comprises capturing said reference images from a plurality of different vehicles, (f) said reference images are different from said video frames and (g) said results of said computer vision operations performed on said reference images enable said weight values to be updated while said apparatus is in operation.

2. The apparatus according to claim 1, wherein said location of each of said passengers is detected by locating a head of each of said passengers within said vehicle.

3. The apparatus according to claim 2, wherein (i) said head of each of said passengers is detected in said video frames captured by one or more capture devices and (ii) said capture devices are configured as a cabin monitoring system of said vehicle.

4. The apparatus according to claim 1, wherein said first audio source is determined in response to analyzing mouth movements of said passengers in said video frames.

5. The apparatus according to claim 4, wherein said mouth movements detected in said video frames are compared to a sound field analysis of audio captured by said microphone.

6. The apparatus according to claim 5, wherein said processor is configured to determine whether said mouth movements correspond to words detected based on said sound field analysis to determine which of said passengers is said first audio source.

7. The apparatus according to claim 1, wherein said processor is configured to locate said first audio source and generate said control signal to adjust said input to said microphone in real time.

8. The apparatus according to claim 1, wherein (i) said microphone is an omnidirectional microphone and (ii) said control signal is configured to adjust said input of said microphone by tuning said omnidirectional microphone towards said first audio source.

9. The apparatus according to claim 1, wherein (i) said microphone is movable and (ii) said control signal is configured to adjust said input of said microphone by changing an angle of said microphone towards said first audio source.

10. The apparatus according to claim 1, wherein said apparatus is configured to capture audio for conference calling in said vehicle.

11. The apparatus according to claim 1, wherein said processor is configured to (i) detect when said first audio source changes from a first of said passengers to a second of said passengers and (ii) generate said control signal to adjust said input of said microphone towards said second of said passengers.

12. The apparatus according to claim 11, wherein said processor is further configured to track which of said passengers is speaking during a conference call and direct said input of said microphone in real time in response to which of said passengers is speaking.

13. The apparatus according to claim 1, wherein waiting until said first audio source has stopped to generate said control signal to adjust said input of said microphone towards said second audio source prevents an interruption by a second of said passengers while a first of said passengers is talking.

14. The apparatus according to claim 1, wherein said processor is further configured to determine when said first audio source has stopped being active by detecting that mouth movements of one of said passengers determined to be said first audio source have stopped by analyzing said video frames.

15. The apparatus according to claim 1, wherein (i) said input of said microphone comprises a polar region, (ii) said control signal is configured to angle a tuned region of said polar region towards said first audio source and (iii) noise cancellation is performed on portions of said polar region outside of said tuned region.

16. The apparatus according to claim 15, wherein said processor is further configured to (i) compare said polar region of said microphone and a second polar region of a second microphone in said interior of said vehicle to said location of said first audio source, (ii) determine which of said polar region and said second polar region covers said location of said first audio source and (iii) generate said control signal to independently adjust (a) said tuned region towards said first audio source if said polar region covers said location of said first audio source, (b) a second tuned region of said second microphone towards said first audio source if said second polar region covers said location of said first audio source, (c) both said polar region and said second polar region towards said first audio source if both said polar region and second polar region cover said location of said first audio source and (d) said control signal is further configured to adjust a second input of said second microphone towards said first audio source.

17. The apparatus according to claim 1, wherein said computer vision operations are further performed by (i) applying a feature detection window to each of a plurality of layers extracted from said video frames, and (ii) a convolution operation using matrix multiplication of said plurality of layers defined by said feature detection window.

18. The apparatus according to claim 1, wherein (i) said references images captured using said fleet learning comprise video data captured using cabin monitoring performed on said plurality of vehicles to provide large amounts of said training data, (ii) said reference images comprise images of (a) people at different locations within said plurality of vehicles and (b) said people talking and not talking and (iii) said fleet learning provides disparate sources of said training data that are used to update said weight values in addition to said video frames captured of said interior of said vehicle.

19. An apparatus comprising:
an interface configured to receive pixel data corresponding to an interior of a vehicle; and
a processor configured to (i) perform computer vision operations on said pixel data arranged as video frames to detect objects in said video frames, (ii) detect one or more passengers based on said objects detected in said video frames, (iii) determine a location of each of said passengers detected, (iv) determine which of said passengers is an audio source and (v) generate a control signal in response to said audio source, wherein (a) said control signal is configured to adjust an input of a microphone towards said audio source, (b) said computer vision operations are used to determine said locations and said audio source, (c) said computer vision operations detect said objects by performing feature extraction based on weight values for each of a plurality of visual features that are associated with said objects extracted from said video frames, (d) said weight values are determined in response to an analysis of training data by said processor prior to said feature extraction, (e) said training data comprises results of said computer vision operations performed on reference images acquired using fleet learning, (f) said fleet learning comprises capturing said reference images from a plurality of different vehicles, (g) said reference images are different from said video frames and (h) said results of said computer vision operations performed on said reference images enable said weight values to be updated while said apparatus is in operation.

20. The apparatus according to claim 19, wherein said computer vision operations are further performed by (a) applying a feature detection window to each of a plurality of layers extracted from said video frames, (b) sliding said feature detection window along each of said plurality of layers and (c) a convolution operation using matrix multiplication of said plurality of layers defined by said feature detection window.

\* \* \* \* \*